(12) United States Patent
Pance et al.

(10) Patent No.: US 12,743,124 B2
(45) Date of Patent: *Sep. 22, 2026

(54) HOUSING AS AN I/O DEVICE

(71) Applicant: Apple Inc., Cupertino, CA (US)

(72) Inventors: Aleksandar Pance, Saratoga, CA (US); Nicholas Vincent King, San Jose, CA (US); Duncan Kerr, San Francisco, CA (US); Brett Bilbrey, Sunnyvale, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 18/810,901

(22) Filed: Aug. 21, 2024

(65) Prior Publication Data

US 2024/0411342 A1 Dec. 12, 2024

Related U.S. Application Data

(63) Continuation of application No. 18/194,223, filed on Mar. 31, 2023, now Pat. No. 12,105,557, which is a (Continued)

(51) Int. Cl.
*G06F 1/16* (2006.01)
*G06F 3/01* (2006.01)
(Continued)

(52) U.S. Cl.
CPC .......... *G06F 1/1616* (2013.01); *G06F 1/1656* (2013.01); *G06F 1/1671* (2013.01);
(Continued)

(58) Field of Classification Search
CPC ...... G06F 1/1616; G06F 3/016; G06F 3/0202; G06F 3/0219; G06F 3/03547
See application file for complete search history.

(56) References Cited

U.S. PATENT DOCUMENTS 3,333,160 A 7/1967 Gorski
3,541,541 A 11/1970 Englebart
(Continued)

FOREIGN PATENT DOCUMENTS

CA 1243096 10/1988
CN 1173672 2/1998
(Continued)

OTHER PUBLICATIONS

International Search Report mailed Oct. 6, 2006, for PCT Application No. PCT/US2006/08349, filed Mar. 3, 2006, three pages. (93.40).

(Continued)

*Primary Examiner* — Adrian S Wilson
(74) *Attorney, Agent, or Firm* — Jinie M. Guihan

(57) ABSTRACT

There are provided systems, devices and methods for operating a housing for an electronic device as an input/output (I/O) device. In one embodiment, an electronic device includes a housing configured to function as an integrated housing and I/O device and one or more sensors obscured by a panel of the housing. The one or more sensors being configured to sense via the panel of the housing. The electronic device further includes a processing unit communicatively coupled to the one or more sensors and configured to interpret electrical signals generated by the one or more sensors. One or more output devices are communicatively coupled to the processing unit and configured to provide an output in response to the one or more sensors generating an electrical signal.

20 Claims, 10 Drawing Sheets

Related U.S. Application Data continuation of application No. 17/736,753, filed on May 4, 2022, now Pat. No. 11,644,865, which is a continuation of application No. 16/923,929, filed on Jul. 8, 2020, now abandoned, which is a continuation of application No. 16/289,014, filed on Feb. 28, 2019, now Pat. No. 10,739,868, which is a continuation of application No. 15/423,437, filed on Feb. 2, 2017, now Pat. No. 10,248,221, which is a continuation of application No. 14/181,516, filed on Feb. 14, 2014, now Pat. No. 9,600,037, which is a continuation of application No. 12/542,471, filed on Aug. 17, 2009, now Pat. No. 8,654,524.

(51) Int. Cl.
*G06F 3/02* (2006.01)
*G06F 3/023* (2006.01)
*G06F 3/0354* (2013.01)
*G06F 3/044* (2006.01)

(52) U.S. Cl.
CPC .......... *G06F 1/1673* (2013.01); *G06F 1/1684* (2013.01); *G06F 3/016* (2013.01); *G06F 3/0227* (2013.01); *G06F 3/0238* (2013.01); *G06F 3/03547* (2013.01); *G06F 3/044* (2013.01)

(56) References Cited

U.S. PATENT DOCUMENTS 3,662,105 A 5/1972 Hurst et al.
3,777,222 A 12/1973 Harris
3,798,370 A 3/1974 Hurst
3,883,861 A 5/1975 Heartz
3,891,786 A 6/1975 Conklin
4,056,699 A 11/1977 Jordan
4,246,452 A 1/1981 Chandler
4,296,410 A 10/1981 Higgs et al.
4,369,439 A 1/1983 Broos
4,506,354 A 3/1985 Hansen
4,550,221 A 10/1985 Mabusth
4,566,001 A 1/1986 Moore et al.
4,672,364 A 6/1987 Lucas
4,672,558 A 6/1987 Beckes et al.
4,692,809 A 9/1987 Beining et al.
4,695,827 A 9/1987 Beining et al.
4,733,222 A 3/1988 Evans
4,734,685 A 3/1988 Watanabe
4,746,770 A 5/1988 McAvinney
4,771,276 A 9/1988 Parks
4,788,384 A 11/1988 Bruere-Dawson et al.
4,806,846 A 2/1989 Kerber
4,891,508 A 1/1990 Campbell
4,896,370 A 1/1990 Kasparian et al.
4,898,555 A 2/1990 Sampson
4,933,660 A 6/1990 Wynne, Jr.
4,968,877 A 11/1990 McAvinney et al.
5,003,519 A 3/1991 Noijean
5,017,030 A 5/1991 Crews
5,059,959 A 10/1991 Barry
5,178,477 A 1/1993 Gambaro
5,189,403 A 2/1993 Franz et al.
5,194,862 A 3/1993 Edwards
5,224,151 A 6/1993 Bowen et al.
5,224,861 A 7/1993 Glass et al.
5,239,152 A 8/1993 Caldwell et al.
5,241,308 A 8/1993 Young
5,252,951 A 10/1993 Tannenbaum et al.
5,281,966 A 1/1994 Walsh
5,285,037 A 2/1994 Baranski et al.
5,305,017 A 4/1994 Gerpheide
5,317,105 A 5/1994 Weber
5,342,991 A 8/1994 Xu et al.
5,345,543 A 9/1994 Capps et al.
5,376,948 A 12/1994 Roberts
5,379,057 A 1/1995 Clough et al.
5,398,310 A 3/1995 Tchao et al.
5,408,060 A 4/1995 Muurinen
5,442,742 A 8/1995 Greyson et al.
5,463,388 A 10/1995 Boie et al.
5,463,696 A 10/1995 Beernink et al.
5,483,261 A 1/1996 Yasutake
5,488,204 A 1/1996 Mead et al.
5,495,077 A 2/1996 Miller et al.
5,513,309 A 4/1996 Meier et al.
5,521,336 A 5/1996 Buchanan et al.
5,523,775 A 6/1996 Capps
5,530,455 A 6/1996 Gillick et al.
5,543,590 A 8/1996 Gillespie et al.
5,543,591 A 8/1996 Gillespie et al.
5,544,020 A 8/1996 Loeber et al.
5,563,632 A 10/1996 Roberts
5,563,996 A 10/1996 Tchao
5,565,658 A 10/1996 Gerpheide et al.
5,579,036 A 11/1996 Yates, IV
5,581,681 A 12/1996 Tchao et al.
5,583,946 A 12/1996 Gourdol
5,590,219 A 12/1996 Gourdol
5,592,566 A 1/1997 Pagallo et al.
5,594,471 A 1/1997 Deeran et al.
5,594,810 A 1/1997 Gourdol
5,596,694 A 1/1997 Capps
5,598,527 A 1/1997 Debrus et al.
5,612,719 A 3/1997 Beernink et al.
5,631,805 A 5/1997 Bonsall
5,633,955 A 5/1997 Bozinovic et al.
5,634,102 A 5/1997 Capps
5,636,101 A 6/1997 Bonsall et al.
5,642,108 A 6/1997 Gopher et al.
5,644,657 A 7/1997 Capps et al.
5,666,113 A 9/1997 Logan
5,666,499 A 9/1997 Baudel et al.
5,666,502 A 9/1997 Capps
5,666,552 A 9/1997 Greyson et al.
5,675,361 A 10/1997 Santilli
5,675,362 A 10/1997 Clough et al.
5,677,710 A 10/1997 Thompson-Rohrlich
5,689,253 A 11/1997 Hargreaves et al.
5,710,844 A 1/1998 Capps et al.
5,729,219 A 3/1998 Armstrong et al.
5,729,250 A 3/1998 Bishop et al.
5,730,165 A 3/1998 Philipp
5,736,976 A 4/1998 Cheung
5,741,990 A 4/1998 Davies
5,745,116 A 4/1998 Pisutha-Arnond
5,745,716 A 4/1998 Tchao et al.
5,748,269 A 5/1998 Harris et al.
5,757,457 A 5/1998 Conway
5,764,818 A 6/1998 Capps et al.
5,766,493 A 6/1998 Shin
5,767,457 A 6/1998 Gerpheide et al.
5,767,842 A 6/1998 Korth
5,770,898 A 6/1998 Hannigan et al.
5,790,104 A 8/1998 Shieh
5,790,107 A 8/1998 Kasser et al.
5,802,516 A 9/1998 Shwarts et al.
5,808,567 A 9/1998 McCloud
5,809,267 A 9/1998 Moran et al.
5,816,225 A 10/1998 Koch et al.
5,821,690 A 10/1998 Martens et al.
5,821,930 A 10/1998 Hansen
5,823,782 A 10/1998 Marcus et al.
5,825,308 A 10/1998 Rosenberg
5,825,351 A 10/1998 Tam
5,825,352 A 10/1998 Biss et al.
5,835,079 A 11/1998 Shieh
5,841,425 A 11/1998 Zenz
5,854,625 A 12/1998 Frisch et al.
5,880,411 A 3/1999 Gillespie et al.
5,886,687 A 3/1999 Gibson
5,898,434 A 4/1999 Small et al.
5,900,848 A 5/1999 Haneda et al.

(56) References Cited

U.S. PATENT DOCUMENTS 5,910,776 A 6/1999 Black
5,910,799 A 6/1999 Carpenter et al.
5,920,309 A 7/1999 Bisset et al.
5,923,319 A 7/1999 Bishop et al.
5,933,134 A 8/1999 Shieh
5,943,044 A 8/1999 Martinelli et al.
5,959,612 A 9/1999 Breyer et al.
5,975,953 A 11/1999 Peterson
5,977,869 A 11/1999 Andreas
5,987,793 A 11/1999 Ebine
5,996,080 A 11/1999 Silva et al.
6,002,389 A 12/1999 Kasser
6,002,808 A 12/1999 Freeman
6,020,881 A 2/2000 Naughton et al.
6,031,524 A 2/2000 Kunert
6,037,882 A 3/2000 Levy
6,049,328 A 4/2000 Vanderheiden
6,050,825 A 4/2000 Nichol et al.
6,052,339 A 4/2000 Frenkel et al.
6,067,074 A 5/2000 Lueders
6,069,648 A 5/2000 Suso et al.
6,072,494 A 6/2000 Nguyen
6,084,576 A 7/2000 Leu et al.
6,107,997 A 8/2000 Ure
6,128,003 A 10/2000 Smith et al.
6,130,663 A 10/2000 Null
6,131,047 A 10/2000 Hayes, Jr. et al.
6,131,299 A 10/2000 Raab et al.
6,135,958 A 10/2000 Mikula-Curtis et al.
6,144,380 A 11/2000 Shwarts et al.
6,179,432 B1 1/2001 Zhang et al.
6,188,391 B1 2/2001 Seely et al.
6,198,470 B1 3/2001 Agam et al.
6,198,515 B1 3/2001 Cole
6,208,329 B1 3/2001 Ballare
6,222,465 B1 4/2001 Kumar et al.
6,224,706 B1 5/2001 Matich
6,232,957 B1 5/2001 Hinckley
6,239,790 B1 5/2001 Martinelli et al.
6,243,071 B1 6/2001 Shwarts et al.
6,246,862 B1 6/2001 Grivas et al.
6,249,606 B1 6/2001 Kiraly et al.
6,257,906 B1 7/2001 Price et al.
6,288,707 B1 9/2001 Philipp
6,289,326 B1 9/2001 LaFleur
6,292,178 B1 9/2001 Bernstein et al.
6,297,811 B1 10/2001 Kent et al.
6,310,610 B1 10/2001 Beaton et al.
6,313,825 B1 11/2001 Gilbert
6,323,846 B1 11/2001 Westerman et al.
6,327,011 B2 12/2001 Kim
6,337,678 B1 1/2002 Fish
6,347,290 B1 2/2002 Bartlett
6,356,287 B1 3/2002 Ruberry et al.
6,377,009 B1 4/2002 Philipp
6,380,931 B1 4/2002 Gillespie et al.
6,384,743 B1 5/2002 Vanderheiden
6,411,287 B1 6/2002 Scharff et al.
6,413,233 B1 7/2002 Sites et al.
6,414,671 B1 7/2002 Gillespie et al.
6,421,234 B1 7/2002 Ricks et al.
6,429,846 B2 8/2002 Rosenberg et al.
6,452,514 B1 9/2002 Philipp
6,457,355 B1 10/2002 Philipp
6,466,036 B1 10/2002 Philipp
6,466,203 B2 10/2002 Van Ee
6,494,491 B1 12/2002 Zeiter et al.
6,515,669 B1 2/2003 Mohri
6,525,749 B1 2/2003 Moran et al.
6,535,200 B2 3/2003 Philipp
6,543,684 B1 4/2003 White et al.
6,543,947 B2 4/2003 Lee
6,559,831 B1 5/2003 Armstrong
6,570,557 B1 5/2003 Westerman et al.
6,587,093 B1 7/2003 Shaw et al.
6,593,916 B1 7/2003 Aroyan
6,597,347 B1 7/2003 Yasutake
6,597,384 B1 7/2003 Harrison
6,608,271 B2 8/2003 Duarte
6,610,936 B2 8/2003 Gillespie et al.
6,624,803 B1 9/2003 Vanderheiden et al.
6,624,833 B1 9/2003 Kumar et al.
6,639,577 B2 10/2003 Eberhand
6,650,319 B1 11/2003 Hurst et al.
6,658,994 B1 12/2003 McMillan
6,661,410 B2 12/2003 Casebolt et al.
6,670,894 B2 12/2003 Mehring
6,677,932 B1 1/2004 Westerman
6,677,934 B1 1/2004 Blanchard
6,690,387 B2 2/2004 Zimmerman et al.
6,704,004 B1 3/2004 Östergård et al.
6,713,672 B1 3/2004 Stickney
6,724,366 B2 4/2004 Crawford
6,757,002 B1 6/2004 Oross et al.
D493,157 S 7/2004 Yang
D493,158 S 7/2004 Yang
D497,606 S 10/2004 Yang
6,800,805 B2 10/2004 Deguchi
6,803,906 B1 10/2004 Morrison et al.
6,816,149 B1 11/2004 Alsleben
D500,298 S 12/2004 Yang
6,834,195 B2 12/2004 Brandenberg et al.
6,842,672 B1 1/2005 Straub et al.
6,847,352 B2 1/2005 Lantigua
6,853,850 B2 2/2005 Shim et al.
6,856,259 B1 2/2005 Sharp
6,873,715 B2 3/2005 Kuo et al.
6,888,532 B2 5/2005 Wong et al.
6,888,536 B2 5/2005 Westerman et al.
6,900,795 B1 5/2005 Knight, III et al.
6,909,424 B2 6/2005 Liebenow et al.
6,924,789 B2 8/2005 Bick
6,927,761 B2 8/2005 Badaye et al.
D509,819 S 9/2005 Yang
D509,833 S 9/2005 Yang
D510,081 S 9/2005 Yang
6,942,571 B1 9/2005 McAllister et al.
6,943,779 B2 9/2005 Satoh
D511,512 S 11/2005 Yang
D511,528 S 11/2005 Yang
6,965,375 B1 11/2005 Gettemy et al.
6,966,032 B1 11/2005 Anderson
D512,403 S 12/2005 Yang
D512,435 S 12/2005 Yang
6,972,401 B2 12/2005 Akitt et al.
6,977,666 B1 12/2005 Hedrick
6,985,801 B1 1/2006 Straub et al.
6,987,466 B1 1/2006 Welch et al.
6,992,659 B2 1/2006 Gettemy
7,013,228 B2 3/2006 Ritt
7,015,894 B2 3/2006 Morohoshi
7,031,228 B2 4/2006 Born et al.
7,034,802 B1 4/2006 Gettemy et al.
D520,516 S 5/2006 Yang
7,046,230 B2 5/2006 Zadesky
7,068,256 B1 6/2006 Gettemy et al.
7,075,793 B2 7/2006 Le et al.
7,109,978 B2 9/2006 Gillespie et al.
7,113,196 B2 9/2006 Kerr
7,125,287 B1 10/2006 Chou et al.
7,129,416 B1 10/2006 Steinfeld et al.
7,129,930 B1 10/2006 Cathey
7,142,189 B2 11/2006 Engelmann
7,145,552 B2 12/2006 Hollingsworth
7,170,496 B2 1/2007 Middleton
7,184,064 B2 2/2007 Zimmerman et al.
7,193,536 B2 3/2007 Shipman
7,240,289 B2 7/2007 Naughton
7,242,393 B2 7/2007 Caldwell
7,244,898 B2 7/2007 Kim
7,312,981 B2 12/2007 Carroll
7,334,362 B2 2/2008 Bladt
RE40,153 E 3/2008 Westerman et al.
7,345,677 B2 3/2008 Ing et al.

(56) References Cited

U.S. PATENT DOCUMENTS 7,366,995 B2 4/2008 Montague
7,388,578 B2 6/2008 Tao
7,411,581 B2 8/2008 Hardie-Bick
7,423,636 B2 9/2008 Sano et al.
7,452,098 B2 11/2008 Kerr
7,453,439 B1 11/2008 Kushler et al.
7,470,866 B2 12/2008 Dietrich et al.
7,473,139 B2 1/2009 Barringer et al.
7,495,659 B2 2/2009 Marriot
7,499,038 B2 3/2009 Nishikawa et al.
7,499,040 B2 3/2009 Zadesky
7,505,785 B2 3/2009 Callaghan et al.
7,511,711 B2 3/2009 Ing et al.
7,533,341 B2 5/2009 Ko
7,573,383 B2 8/2009 Yun et al.
7,575,481 B1 8/2009 Liu
7,592,999 B2 9/2009 Rosenberg et al.
7,605,707 B2 10/2009 German et al.
7,620,316 B2 11/2009 Boillot
7,656,393 B2 2/2010 King et al.
7,663,607 B2 2/2010 Hotelling et al.
7,710,397 B2 5/2010 Krah et al.
7,725,288 B2 5/2010 Boillot
7,728,799 B2 6/2010 Kerr
7,766,517 B2 8/2010 Kerr et al.
7,774,774 B1 8/2010 Mulligan et al.
7,800,592 B2 9/2010 Kerr et al.
7,834,855 B2 11/2010 Hotelling et al.
7,844,310 B2 11/2010 Anderson
7,852,369 B2 12/2010 Cutler et al.
7,880,131 B2 2/2011 Andre et al.
7,884,315 B2 2/2011 Andre et al.
7,924,175 B2 4/2011 Gitzinger et al.
7,982,720 B2 7/2011 Rosenberg et al.
8,029,166 B2 10/2011 Kerr et al.
8,031,181 B2 10/2011 Rosenberg et al.
8,033,695 B2 10/2011 Kerr et al.
8,059,105 B2 11/2011 Rosenberg et al.
8,098,233 B2 1/2012 Hotelling et al.
8,102,273 B2 1/2012 Amano et al.
8,148,913 B2 4/2012 Kerr et al.
8,149,226 B2 4/2012 Oki
8,194,049 B2 6/2012 Oki
8,255,868 B1 8/2012 Robalewski
8,264,167 B2 9/2012 Kerr et al.
8,390,481 B2 3/2013 Pance et al.
8,395,330 B2 3/2013 Kerr et al.
8,427,296 B2 4/2013 Pance et al.
8,441,790 B2 5/2013 Pance et al.
8,479,122 B2 7/2013 Hotelling et al.
8,654,524 B2 * 2/2014 Pance .................. G06F 3/0238 361/679.55
8,749,523 B2 6/2014 Pance et al.
8,799,780 B2 8/2014 Borkowski et al.
8,945,972 B2 2/2015 Van Krevel et al.
9,384,916 B1 7/2016 Matsuoka et al.
9,600,037 B2 * 3/2017 Pance .................... G06F 3/016
10,248,221 B2 * 4/2019 Pance .................. G06F 1/1671
10,739,868 B2 * 8/2020 Pance .................. G06F 1/1616
11,644,865 B2 * 5/2023 Pance .................. G06F 1/1684 361/600
12,105,557 B2 * 10/2024 Pance .................. G06F 1/1656
2001/0022719 A1 9/2001 Armitage et al.
2001/0035854 A1 11/2001 Rosenberg et al.
2001/0043189 A1 11/2001 Brisebois et al.
2002/0008691 A1 1/2002 Hanajima et al.
2002/0015024 A1 * 2/2002 Westerman .......... G06F 3/0446 345/173
2002/0093492 A1 7/2002 Baron
2002/0118174 A1 8/2002 Rodgers
2002/0118848 A1 8/2002 Karpenstein
2002/0158838 A1 10/2002 Smith et al.
2003/0006974 A1 1/2003 Clough et al.
2003/0011574 A1 1/2003 Goodman
2003/0025735 A1 2/2003 Polgar et al.
2003/0038785 A1 2/2003 Suzuki et al.
2003/0063072 A1 4/2003 Brandenberg et al.
2003/0074977 A1 4/2003 Doemens et al.
2003/0076301 A1 4/2003 Tsuk et al.
2003/0076303 A1 4/2003 Huppi
2003/0076306 A1 4/2003 Zadesky et al.
2003/0079977 A1 5/2003 Wei
2003/0085870 A1 5/2003 Hinckley
2003/0085882 A1 5/2003 Lu
2003/0095095 A1 5/2003 Pihlaja
2003/0095096 A1 5/2003 Robbin et al.
2003/0098858 A1 5/2003 Perski et al.
2003/0122794 A1 * 7/2003 Caldwell .............. A47F 5/0043 345/173
2003/0142855 A1 7/2003 Kuo et al.
2003/0179223 A1 9/2003 Ying et al.
2003/0206202 A1 11/2003 Moriya
2003/0206394 A1 * 11/2003 Ossia .................... G06F 3/0238 361/679.09
2003/0210286 A1 11/2003 Gerpheide et al.
2003/0222848 A1 12/2003 Solomon et al.
2003/0234768 A1 12/2003 Rekimoto
2004/0003947 A1 1/2004 Kesselman et al.
2004/0008191 A1 1/2004 Poupyrev et al.
2004/0012572 A1 1/2004 Sowden et al.
2004/0021643 A1 2/2004 Hoshino et al.
2004/0026136 A1 * 2/2004 Hill ...................... G06F 1/1698 178/18.01
2004/0049743 A1 * 3/2004 Bogward ............. G06F 1/1626 715/262
2004/0077373 A1 * 4/2004 Choi ...................... H04M 1/23 455/575.1
2004/0156192 A1 * 8/2004 Kerr .................... H05B 47/196 362/154
2004/0212586 A1 10/2004 Denny, III
2004/0238195 A1 12/2004 Thompson
2004/0242295 A1 12/2004 Ghaly
2004/0246231 A1 12/2004 Large
2004/0247935 A1 12/2004 Bladt
2004/0252109 A1 12/2004 Trent, Jr. et al.
2004/0263483 A1 * 12/2004 Aufderheide .......... G06F 3/041 345/173
2004/0263484 A1 12/2004 Mantysalo et al.
2005/0012723 A1 1/2005 Pallakoff
2005/0027744 A1 2/2005 Avadhanam et al.
2005/0035955 A1 * 2/2005 Carter .............. H04M 1/72403 345/175
2005/0043060 A1 2/2005 Brandenberg et al.
2005/0052425 A1 3/2005 Zadesky et al.
2005/0057916 A1 3/2005 Yu et al.
2005/0068322 A1 3/2005 Falcioni
2005/0073446 A1 4/2005 Lazaridis et al.
2005/0084138 A1 4/2005 Inkster et al.
2005/0104867 A1 5/2005 Westerman et al.
2005/0110768 A1 5/2005 Marriott et al.
2005/0115816 A1 6/2005 Gelfond et al.
2005/0135053 A1 6/2005 Carroll
2005/0146509 A1 7/2005 Geaghan et al.
2005/0146513 A1 7/2005 Hill et al.
2005/0154798 A1 7/2005 Nurmi
2005/0168488 A1 8/2005 Montague
2005/0190158 A1 9/2005 Casebolt et al.
2005/0212760 A1 9/2005 Marvit et al.
2005/0212777 A1 9/2005 Ing et al.
2005/0219228 A1 10/2005 Alameh
2005/0226455 A1 10/2005 Aubauer et al.
2005/0253818 A1 * 11/2005 Nettamo .............. G06F 3/0488 345/173
2005/0275637 A1 12/2005 Hinckley et al.
2005/0277447 A1 12/2005 Buil et al.
2006/0010400 A1 1/2006 Dehlin et al.
2006/0022955 A1 2/2006 Kennedy
2006/0022956 A1 2/2006 Lengeling et al.
2006/0026521 A1 2/2006 Hotelling et al.
2006/0026535 A1 2/2006 Hotelling et al.
2006/0026536 A1 2/2006 Hotelling et al.
2006/0032680 A1 * 2/2006 Elias .................. G06F 3/04166 178/18.06

(56) References Cited

U.S. PATENT DOCUMENTS

2006/0033724 A1 2/2006 Chaudhri et al.
2006/0034042 A1 2/2006 Hisano et al.
2006/0037848 A1 2/2006 Kobayashi
2006/0042820 A1 3/2006 Lin et al.
2006/0044259 A1 3/2006 Hotelling et al.
2006/0050011 A1 3/2006 Kamio
2006/0053387 A1 3/2006 Ording
2006/0066579 A1 3/2006 Bladt
2006/0066582 A1 3/2006 Lyon et al.
2006/0078175 A1 4/2006 Brozovich
2006/0079969 A1 4/2006 Seguin
2006/0085757 A1 4/2006 Andre et al.
2006/0097991 A1 5/2006 Hotelling et al.
2006/0109252 A1 5/2006 Kolmykov-Zotov et al.
2006/0161871 A1 7/2006 Hotelling et al.
2006/0181517 A1 8/2006 Zadesky et al.
2006/0183505 A1 8/2006 Willrich
2006/0197750 A1 9/2006 Kerr et al.
2006/0197753 A1 9/2006 Hotelling
2006/0232567 A1 10/2006 Westerman et al.
2006/0238517 A1 10/2006 King et al.
2006/0238518 A1 10/2006 Westerman et al.
2006/0238519 A1 10/2006 Westerman et al.
2006/0238520 A1 10/2006 Westerman et al.
2006/0238521 A1 10/2006 Westerman et al.
2006/0238522 A1 10/2006 Westerman et al.
2006/0244733 A1 11/2006 Geaghan
2006/0245808 A1 11/2006 Salman et al.
2006/0267953 A1 11/2006 Peterson et al.
2006/0284855 A1 12/2006 Shintome
2007/0046646 A1 3/2007 Kwon et al.
2007/0063923 A1* 3/2007 Koenig ................. G06F 1/1647 345/1.1
2007/0075968 A1 4/2007 Hall et al.
2007/0080818 A1* 4/2007 Yun ..................... H01R 13/641 340/584
2007/0085845 A1 4/2007 Kikuchi et al.
2007/0136064 A1* 6/2007 Carroll .................. G06F 1/1613 704/235
2007/0182722 A1 8/2007 Hotelling et al.
2007/0229464 A1 10/2007 Hotelling et al.
2007/0236466 A1 10/2007 Hotelling
2007/0242033 A1 10/2007 Cradick et al.
2007/0247429 A1 10/2007 Westerman
2007/0257890 A1 11/2007 Hotelling et al.
2007/0273561 A1 11/2007 Philipp
2008/0012835 A1 1/2008 Rimon et al.
2008/0012838 A1 1/2008 Rimon
2008/0048971 A1 2/2008 Beckhusen et al.
2008/0084404 A1 4/2008 Andre et al.
2008/0088602 A1 4/2008 Hotelling
2008/0103637 A1 5/2008 Bliven et al.
2008/0111788 A1* 5/2008 Rosenberg ............ G06F 3/0488 345/156
2008/0158172 A1 7/2008 Hotelling et al.
2008/0174321 A1 7/2008 Kang et al.
2008/0179172 A1 7/2008 Sellers
2008/0211772 A1 9/2008 Loucks
2008/0238725 A1 10/2008 Gitzinger et al.
2008/0238879 A1 10/2008 Jaeger et al.
2008/0266257 A1 10/2008 Chiang
2008/0278450 A1 11/2008 Lashina
2008/0297476 A1 12/2008 Hotelling et al.
2008/0309511 A1 12/2008 Kerr et al.
2009/0002328 A1 1/2009 Ullrich et al.
2009/0008234 A1 1/2009 Tolbert et al.
2009/0052715 A1 2/2009 Zhang et al.
2009/0066670 A1 3/2009 Hotelling et al.
2009/0085894 A1 4/2009 Gandhi et al.
2009/0096757 A1 4/2009 Hotelling et al.
2009/0096758 A1 4/2009 Hotelling et al.
2009/0151475 A1 6/2009 Masaki et al.
2009/0173533 A1 7/2009 Brock et al.
2009/0173534 A1 7/2009 Keiper et al.
2009/0176391 A1 7/2009 Brock et al.
2009/0189878 A1 7/2009 Goertz et al.
2009/0244836 A1 10/2009 Leng et al.
2009/0266170 A1 10/2009 Murashige et al.
2009/0284465 A1 11/2009 Oki et al.
2009/0295738 A1 12/2009 Chiang
2009/0295753 A1 12/2009 King et al.
2009/0303231 A1 12/2009 Robinet et al.
2010/0011291 A1 1/2010 Nurmi
2010/0026656 A1 2/2010 Hotelling et al.
2010/0044067 A1 2/2010 Wong et al.
2010/0122439 A1 5/2010 Britton et al.
2010/0141605 A1 6/2010 Kang et al.
2010/0164888 A1 7/2010 Okumura et al.
2010/0238139 A1 9/2010 Goertz et al.
2010/0301755 A1 12/2010 Pance et al.
2010/0306683 A1 12/2010 Pance et al.
2011/0037624 A1 2/2011 Pance et al.
2011/0037734 A1 2/2011 Pance et al.
2011/0038114 A1 2/2011 Pance et al.
2011/0043227 A1 2/2011 Pance et al.
2011/0057873 A1 3/2011 Geissler et al.
2011/0119973 A1 5/2011 Andre et al.
2011/0175813 A1 7/2011 Sarwar et al.
2016/0014390 A1 1/2016 Ligtenberg et al.
2019/0196605 A1 6/2019 Pance et al.

FOREIGN PATENT DOCUMENTS

CN 1397870 2/2003
CN 1720499 1/2006
CN 1737827 2/2006
CN 1942853 4/2007
CN 201898231 7/2011
DE 10251296 5/2004
EP 0288692 2/1988
EP 0464908 1/1992
EP 0664504 7/1995
EP 1014295 6/2000
EP 1241557 9/2002
EP 1241558 9/2002
EP 1505484 2/2005
GB 2380583 9/2003
GB 2393688 7/2004
JP 58112263 7/1983
JP 63257824 10/1988
JP 63-292774 11/1988
JP 0764725 3/1995
JP 7182101 7/1995
JP 09244810 9/1997
JP 9305262 11/1997
JP 10228350 8/1998
JP 11-215217 8/1999
JP 2000-163031 6/2000
JP 2001356878 12/2001
JP 2002501271 1/2002
JP 2002062972 2/2002
JP 2002185630 6/2002
JP 2002229719 8/2002
JP 2002-342033 11/2002
JP 2002342034 11/2002
JP 2003-058316 2/2003
JP 2003241872 8/2003
JP 2003330611 11/2003
JP 2004070920 3/2004
JP 2004226715 8/2004
JP 2004340991 12/2004
JP 2005-006259 1/2005
KR 20010047975 6/2001
WO 9718547 5/1997
WO 9723738 7/1997
WO 1997025213 A1 7/1997
WO 9814863 4/1998
WO 9938149 7/1999
WO 03001576 1/2003
WO 03065192 8/2003
WO 03088176 10/2003
WO 2004111816 12/2004
WO 2005083547 9/2005
WO 2006023569 3/2006

(56) References Cited

FOREIGN PATENT DOCUMENTS

| | | |
|---|---|---|
| WO | 2006094308 | 9/2006 |
| WO | 2006096501 | 9/2006 |
| WO | 2007083894 | 7/2007 |
| WO | 2007103631 | 9/2007 |
| WO | 2010014560 | 2/2010 |

OTHER PUBLICATIONS

International Search Report mailed Jan. 3, 2008, for PCT Application No. PCT/US2007/062474, filed Feb. 21, 2007, three pages. (93.41).
International Search Report mailed Nov. 27, 2009, for PCT Application No. PCT/US2009/051874, Filed Jul. 27, 2009, three pages.
Iriver clix Product Guide, copyright 1999-2006, 38 pages.
Iriver clix Quick Start Guide, undated, 2 pages.
Jacob et al., “Integrality and Separability of Input Devices,” ACM Transactions on Computer-Human Interaction, 1:3-26 (Mar. 1994).
Kionx “KXP84 Series Summary Data Sheet” copyright 2005, dated Oct. 21, 2005, 4-pgs.
Lee, “A Fast Multiple-Touch-Sensitive Input Device,” Master’s Thesis, University of Toronto (1984).
Lee, S.K. et al., “A Multi-Touch Three Dimensional Touch-Sensitive Tablet,” in CHI ’85 Proceedings, pp. 121-128, 2000 [(Apr. 1985). Conference Proceedings: Human Factors in Computing Systems, pp. 21-25.].
Matsushita et al., “HoloWall: Designing a Finger, Hand, Body and Object Sensitive Wall,” In Proceedings of UIST ’97, Oct. 1997.
Non-Final Office Action mailed Jul. 2, 2008, for U.S. Appl. No. 11/115,539, filed Apr. 26, 2005, 18 pages. (210.00).
Non-Final Office Action mailed Feb. 26, 2009, for U.S. Appl. No. 11/367,749, filed Mar. 3, 2006, 10 pages. (93.00).
Non-Final Office Action mailed Apr. 2, 2009, for U.S. Appl. No. 11/426,078, filed Jun. 23, 2006, 21 pages. (93.20).
Non-Final Office Action mailed Apr. 6, 2009, for U.S. Appl. No. 11/115,539, filed Apr. 26, 2005, 31 pages. (210.00).
Non-Final Office Action mailed Jan. 12, 2010, for U.S. Appl. No. 11/367,749, filed Mar. 3, 2006, eight pages. (93.00).
Non-Final Office Action mailed Jan. 15, 2010, for U.S. Appl. No. 11/115,539, filed Apr. 26, 2005, 10 pages. (210.00).
Non-Final Office Action mailed Jan. 28, 2011, for U.S. Appl. No. 11/966,948, filed Dec. 28, 2007, 11 pages. (93.01).
Non-Final Office Action mailed Mar. 9, 2011, for U.S. Appl. No. 12/486,710, filed Jun. 17, 2009, 13 pages. (93.02).
Non-Final Office Action mailed Dec. 2, 2011, for U.S. Appl. No. 12/184,190, filed Jul. 31, 2008, 21 pages. (235.00).
Non-Final Office Action mailed Mar. 28, 2012, for U.S. Appl. No. 12/486,710, filed Jun. 17, 2009, 25 pages. (93.02).
Non-Final Office Action mailed Jul. 5, 2012, for U.S. Appl. No. 12/184,190, filed Jul. 31, 2008, 19 pages. (235.00).
Non-Final Office Action mailed Jun. 6, 2013, for U.S. Appl. No. 12/486,710, filed Jun. 17, 2009, 28 pages. (93.02).
Non-Final Office Action mailed Jul. 5, 2013, for U.S. Appl. No. 11/367,749, filed Mar. 3, 2006, eight pages. (93.00).
Notice of Allowance mailed Sep. 25, 2009, for U.S. Appl. No. 11/426,078, filed Jun. 23, 2006, 14 pages. (93.20).
Notice of Allowance mailed Jun. 2, 2010, for U.S. Appl. No. 11/115,539, filed Apr. 26, 2005, eight pages. (210.00).
Press Release, “iriver clix Delivers Complete Package for Portable Entertainment Fans,” obtained from www.iriveramerican.com/images.pdf/iriv_clix.pdf, dated May 17, 2006, 3 pages.
Quantum Research Group “QT510 / Qwhee1TM Touch Slider IC” copyright 2004-2005, 14-pgs.
Quek, “Unencumbered Gestural Interaction,” IEEE Multimedia, 3:36-47 (Winter 1996).
Radwin, “Activation Force and Travel Effects on Overexertion in Repetitive Key Tapping,” Human Factors, 39(1):130-140 (Mar. 1997).
Rekimoto et al., “ToolStone: Effective Use of the Physical Manipulation Vocabularies of Input Devices,” In Proc. Of UIST 2000, 2000.
Rekimoto, J. (2002). “SmartSkin: An Infrastructure for Freehand Manipulation on Interactive Surfaces,” CHI 2002, Apr. 20-25, 2002. [(Apr. 25, 2002). 4(1):113-120.].
Rubine et al., “Programmable Finger-Tracking Instrument Controllers,” Computer Music Journal, vol. 14, No. 1 (Spring 1990).
Rubine, D.H. (Dec. 1991). “The Automatic Recognition of Gestures,” CMU-CS-91-202, Submitted in Partial Fulfillment of the Requirements for the Degree of Doctor of Philosophy in Computer Science at Carnegie Mellon University, 285 pages.
Rubine, D.H. (May 1992). “Combining Gestures and Direct Manipulation,” CHI ’92, pp. 659-660.
Rutledge et al., “Force-To-Motion Functions For Pointing,” Human-Computer Interaction—INTERACT (1990).
Subatai Ahmad, “A Usable Real-Time 3D Hand Tracker,” Proceedings of the 28th Asilomar Conference on Signals, Systems and Computers—Part 2 (of 2), vol. 2 (Oct. 1994).
Texas Instruments, “TSC2003/12C Touch Screen Controller,” Data Sheet SBAS 162, dated Oct. 2001, 20 pages.
U.S. Appl. No. 10/789,676, filed Feb. 27, 2004 entitled “Shape Detecting Input Device”.
Wellner, “The Digital Desk Calculators: Tangible Manipulation on a Desk Top Display” In ACM UIST ’91 Proceedings, pp. 27-34, Nov. 1991.
Westerman, W. (Spring 1999). “Hand Tracking, Finger Identification, and Chordic Manipulation on a Multi-Touch Surface,” A Dissertation Submitted to the Faculty of the University of Delaware in Partial Fulfillment of the Requirements for the Degree of Doctor of Philosophy in Electrical Engineering, 364 pages.
Williams, “Applications for a Switched-Capacitor Instrumentation Building Block” Linear Technology Application Note 3, Jul. 1985, pp. 1-16.
Yamada et al., “A Switched-Capacitor Interface for Capacitive Pressure Sensors” IEEE Transactions on Instrumentation and Measurement, vol. 41, No. 1, Feb. 1992, pp. 81-86.
Haruyama, U.S. Appl. No. 13/577,757, filed Feb. 1, 2013.
Yeh et al., “Switched Capacitor Interface Circuit for Capacitive Transducers” 1985 IEEE.
Zhai et al., “Dual Stream Input for Pointing and Scrolling,” Proceedings of CHI’ 97 Extended Abstracts (1997).
Zimmerman et al., “Applying Electric Field Sensing to Human-Computer Interfaces,” In CHI ’85 Proceedings, pp. 280-287, 1995.
Anonymous. (Apr. 13, 2004). Proximity Sensor Demo Kit, User Guide, Version 0.62—Preliminary, Integration Associates, Inc., 14 pages.
Anonymous. “Touch Technologies Overview” 2001, 3M Touch Systems, Massachusetts.
Anonymous. “4-Wire Resistive Touchscreens” obtained from http://www.touchscreens.com/intro-touchtypes-4resistive.html generated Aug. 5, 2005.
Anonymous. “5-Wire Resistive Touchscreens” obtained from http://www.touchscreens.com/intro-touchtypes-resistive.html generated Aug. 5, 2005.
Anonymous. “A Brief Overview of Gesture Recognition” obtained from http://www. Dai. Ed. Ac.uk/Cvonline/LOCA_COPIES/COHEN/gesture_ overview. Html, generated Apr. 20, 2004.
Anonymous. “Capacitive Position Sensing” obtained from http://www.synaptics.com/technology/cps.cfin generated Aug. 5, 2005.
Anonymous “Capacitive Touchscreens” obtained from http://www.touchscreens.com/intro touchtypes-capacitive.html generated Aug. 5, 2005.
Anonymous. “Comparing Touch Technologies” obtained from http://www.touchscreens.com/intro-touchtypes.html generated Oct. 10, 2004.
Anonymous. “FingerWorks—Gesture Guide—Application Switching,” obtained from http://www.fingerworks.com/gesture_guide_apps.html, generated on Aug. 27, 2004, 1-pg.
Anonymous. “FingerWorks—Gesture Guide—Editing,” obtained from http://www.fingerworks.com/gesure_guide_editing.html, generated on Aug. 27, 2004, 1-pg.

(56) References Cited

OTHER PUBLICATIONS

Anonymous. "FingerWorks—Gesture Guide—File Operations," obtained from http://www.fingerworks.com/gesture_guide_files.html, generated on Aug. 27, 2004, 1-pg.
Anonymous. "FingerWorks—Gesture Guide—Text Manipulation," obtained from http://www.fingerworks.com/gesture_guide_text_manip.html, generated on Aug. 27, 2004, 2-pg.
Anonymous. "FingerWorks—Gesture Guide—Tips and Tricks," obtained from http://www.fingerworks.com/gesture_guide_tips.html, generated Aug. 27, 2004, 2 pgs.
Anonymous. "FingerWorks—Gesture Guide—Web," obtained from http://www.fingerworks.com/gesture_guide_web.html, generated on Aug. 27, 2004, 1-pg.
Anonymous. "FingerWorks—Guide to Hand Gestures for USB Touchpads," obtained from http://www.fingerworks.com/igesture_userguide.html, generated Aug. 27, 2004, 1 pg.
Anonymous. "FingerWorks—iGesture—Technical Details," obtained from http://www.fingerworks.com/igesture_tech.html, generated Aug. 27, 2004, 1-pg.
Anonymous. "FingerWorks—The Only Touchpads with Ergonomic Full-Hand Resting and Relaxation!" obtained from http://www.fingerworks.com/resting.html, Copyright 2001, 1-pg.
Anonymous. "FingerWorks—Tips for Typing on the Mini," obtained from http://www.fingerworks.com/mini_typing.html, generated on Aug. 27, 2004, 2-pgs.
Anonymous. "GlidePoint®" obtained from http://www.cirque.com/technology/technology_gp.html generated Aug. 5, 2005.
Anonymous. "Gesture Recognition" http://www.fingerworks.com/gesture_recognition.htm1>, Jul. 2, 2006.
Anonymous. "How do touchscreen monitors know where you're touching?" obtained from http://www.electronics.howstuffworks.com/question716.html generated Aug. 5, 2005.
Anonymous. "How does a touchscreen work?" obtained from http://www.touchscreens.com/intro-anatomy.html generated Aug. 5, 2005.
Anonymous. "iGesture Pad—the MultiFinger USB TouchPad with Whole-Hand Gestures," obtained from http://www.fingerworks.com/igesture.html, generated Aug. 27, 2004, 2-pgs.
Anonymous. "iGesture Products for Everyone (learn in minutes) Product Overview" FingerWorks.com downloaded Aug. 30, 2005.
Anonymous. "Infrared Touchscreens" obtained from http://www.touchscreens.com/intro touchtypes-infrared.html generated Aug. 5, 2005.
Anonymous. "Mouse Emulation" FingerWorks obtained from http://www.fingerworks.com/gesture_guide_mouse.html generated Aug. 30, 2005.
Anonymous. "Mouse Gestures in Opera" obtained from http://www.opera.com/products/desktop/mouse/index.dml generated Aug. 30, 2005.
Anonymous. "Mouse Gestures," Optim oz, May 21, 2004.
Anonymous. "MultiTouch Overview" FingerWorks obtained from http://www.fingerworks.com/multoverview.html generated Aug. 30, 2005.
Anonymous. "Near Field Imaging Touchscreens" obtained from http://www.touchscreens.com/intro-touchtypes-nfi.html generated Aug. 5, 2005.
Anonymous. "PenTouch Capacitive Touchscreens" obtained from http://www.touchscreens.com/intro-touchtypes-pentouch.html generated Aug. 5, 2005.
Anonymous. "Surface Acoustic Wave Touchscreens" obtained from http://www.touchscreens.com/intro-touchtypes-saw.html generated Aug. 5, 2005.
Anonymous. "Symbol Commander" obtained from http://www.sensiva.com/symbolcommander/, generated Aug. 30, 2005.
Anonymous. "Wacom Components—Technology" obtained from http://www.wacom-components.com/english/tech.asp generated on Oct. 10, 2004.
Anonymous. "Watershed Algorithm" http://rsb.info.nih.gov/ij/plugins/watershed.html generated Aug. 5, 2005.
Bier et al., "Toolglass and Magic Lenses: The see-through interface" In James Kijiya, editor, Computer Graphics (SIGGRAPH '93 Proceedings), vol. 27, pp. 73-80, Aug. 1993.
Douglas et al., The Ergonomics of Computer Pointing Devices (1997).
European Examination Report mailed Apr. 21, 2008, for EP Application No. 06737515.4, filed Mar. 3, 2006, five pages. (93.47).
European Search Report received in EP 1 621 989 (@ Beyer Weaver & Thomas, LLP) dated Mar. 27, 2006.
European Search Report mailed Nov. 9, 2010, for EP Application No. 10010075.9, filed Mar. 3, 2006, six pages. (93.47).
EVB Elektronik "TSOP6238 IR Receiver Modules for Infrared Remote Control Systems" dated Jan. 2004 1-pg.
Final Office Action mailed Nov. 8, 2012, for U.S. Appl. No. 12/184,190, filed Jul. 31, 2008, 20 pages. (235.00).
Final Office Action mailed Nov. 21, 2008, for U.S. Appl. No. 11/115,539, filed Apr. 26, 2005, 23 pages. (210.00).
Final Office Action mailed Aug. 25, 2009, for U.S. Appl. No. 11/367,749, filed Mar. 3, 2006, 12 pages. (93.00).
Final Office Action mailed Oct. 14, 2009, for U.S. Appl. No. 11/115,539, filed Apr. 26, 2005, 10 pages. (210.00).
Final Office Action mailed Jun. 30, 2010, for U.S. Appl. No. 11/367,749, filed Mar. 3, 2006, 12 pages. (93.00).
Final Office Action mailed Jul. 1, 2011, for U.S. Appl. No. 12/486,710, filed Jun. 17, 2009, 19 pages. (93.02).
Final Office Action mailed Jul. 13, 2011, for U.S. Appl. No. 11/966,948, filed Dec. 28, 2007, 10 pages. (93.01).
Final Office Action mailed Sep. 4, 2012, for U.S. Appl. No. 12/486,710, filed Jun. 17, 2009, 25 pages. (93.02).
Fisher et al., "Repetitive Motion Disorders: The Design of Optimal Rate- Rest Profiles," Human Factors, 35(2):283-304 (Jun. 1993).
Fukumoto and Yoshinobu Tonomura, "Body Coupled Fingering: Wireless Wearable Keyboard," CHI97, pp. 147-154 (Mar. 1997).
Fukumoto et al., "ActiveClick: Tactile Feedback for Touch Panels," In CHI 2001 Summary, pp. 121-122, 2001.
Gear Live Review: iRiver clix Review, obrained from http://www.gearlive.com/index.php/news/article/gear-live-review-iriver-clix-review-713400/, dated Jul. 13, 2006, 8 pages.
Hardy, "Fingerworks" Mar. 7, 2002; BBC World On Line.
Hillier and Gerald J. Lieberman, Introduction to Operations Research (1986).
Hinckley et al., "Touch-Sensing Input Devices," in CHI '99 Proceedings, pp. 223-230, 1999.
International Search Report dated Mar. 3, 2006 (PCT/US05/03325; 119 0052WO).
International Search Report dated Jul. 25, 2006, from corresponding International Application No. PCT/US2006/007585 with Written Opinion, nine pages. (210.40).

* cited by examiner

HOUSING I/O INTERFACE
200
202
EXTERNAL DATA
FEEDBACK
HOUSING
204
206
HOUSING INPUT ELEMENT
208
HOUSING OUTPUT ELEMENT
212
210
CONTROLLER

ELECTRONIC DEVICE
214
INPUT
EXTERNAL DATA
HOUSING
FEEDBACK
OUTPUT
INPUT
216
INPUT ELEMENT
208
OUTPUT ELEMENT
212
OUTPUT
218
CONTROLLER
210

220
PROVIDE HOUSING SURFACE
222
MEASURE EXTERNAL DATA AT OR OUTSIDE HOUSING SURFACE
224
PERFORM ACTION (FEEDBACK)
226

HOUSING AS AN I/O DEVICE

This application is a continuation of U.S. patent application Ser. No. 18/194,223, filed on Mar. 31, 2023, which is a continuation of U.S. patent application Ser. No. 17/736,753, filed on May 4, 2022, now U.S. Pat. No. 11,644,865, which is a continuation of U.S. patent application Ser. No. 16/923,929, filed on Jul. 8, 2020, which is a continuation of U.S. patent application Ser. No. 16/289,014, filed on Feb. 28, 2019, now U.S. Pat. No. 10,739,868, which is a continuation of U.S. patent application Ser. No. 15/423,437, filed on Feb. 2, 2017, now U.S. Pat. No. 10,248,221, which is a continuation of U.S. patent application Ser. No. 14/181,516, filed on Feb. 14, 2014, now U.S. Pat. No. 9,600,037, which is a continuation application of U.S. patent application Ser. No. 12/542,471, filed on Aug. 17, 2009, now U.S. Pat. No. 8,654,524, each of which are hereby incorporated by reference herein in their entireties. This application claims the benefit of and claims priority to U.S. patent application Ser. No. 17/736,753, filed on May 4, 2022, U.S. patent application Ser. No. 16/923,929, filed on Jul. 8, 2020, U.S. patent application Ser. No. 16/289,014, filed on Feb. 28, 2019, now U.S. Pat. No. 10,739,868, U.S. patent application Ser. No. 15/423,437, filed on Feb. 2, 2017, now U.S. Pat. No. 10,248,221, U.S. patent application Ser. No. 14/181,516, filed on Feb. 14, 2014, now U.S. Pat. No. 9,600,037, and U.S. patent application Ser. No. 12/542,471, filed on Aug. 17, 2009, now U.S. Pat. No. 8,654,524. The following related applications are hereby incorporated by reference in their entirety: United States patent publication number 2013/0135213 and United States patent publication number 2011/0037734.

BACKGROUND

I. Technical Field

The present invention relates generally to electronic devices and, more particularly, to housings of electronic devices providing input/output (I/O) functionality.

II. Background Discussion

Electronic devices such as desktop computers, notebook computers, personal digital assistants, cell phones and mobile media devices have become ubiquitous in today's society. They serve as work tools, communication devices and provide entertainment, among other things. Generally, the "brains" and operative parts of electronic devices are enclosed in housings made of plastic, metal and/or glass that may provide an aesthetically pleasing appearance. Typically, however, the housings simply provide structural integrity to the devices and protect potentially sensitive component parts of the electronic devices from external influences.

Users generally interact with electronic devices through discrete input/output (I/O) devices such as a keyboard, mouse, camera, monitor, printer, and so forth. In some instances, I/O devices are located at least partially within the housing and accessible through openings in the housing. For example, portable computing devices such as notebook computers typically provide a keyboard and trackpad secured to the housing and accessible to a user through cutouts in the housing. In other instances, I/O devices may be external to the housing and communicatively coupled to the electronic device either wirelessly or by wired means.

SUMMARY

Certain embodiments may take the form of housings for electronic devices with integrated I/O and related methods. For example, in one embodiment, an electronic device includes a housing configured to function as an integrated housing and I/O device and one or more sensors obscured by a wall of the housing. The one or more sensors may be configured to sense inputs, such as through a touch or via the wall of the housing. The electronic device further includes a processing unit communicatively coupled to the one or more sensors and configured to interpret electrical signals generated by the one or more sensors. One or more output devices may be communicatively coupled to the processing unit and configured to provide an output in response to the one or more sensors generating an electrical signal.

Another embodiment takes the form of an electronic device housing having a wall with at least one exposed surface and an interior surface. One or more sensors are positioned within the housing and proximate to the wall's interior surface in order to sense user interactions with the exposed surface and generate electrical signals based on the interactions. A controller is communicatively coupled to the one or more sensors and may interpret the electrical signals as and electronic device input. The controller may also generate an output signal. Additionally, at least one output device is positioned within the housing and communicatively coupled to the controller to receive the output signal. In response to receiving the output signal, the at least one output device provides output via the housing.

Yet another embodiment may take the form of or include an electronic device housing having one or more walls configured to house an electronic device wherein the one or more walls are configured to operate as an input/output (I/O) device. The one or more walls are externally exposed. The one or more walls may be made of microperforated material. In other embodiments, the one or more walls may be made of plastic, glass or other material that is not microperforated. A proximity sensor is positioned within an interior of the housing and proximate to the one or more walls. The proximity sensor is configured to sense user input via the one or more walls. A processor is coupled to the proximity sensor and configured to process electrical signals generated by the proximity sensor. Additionally, at least one light emitting diode may be positioned within the interior of the housing and proximate to the one or more walls. The at least one light emitting diode is actuated by the processor in response to the electrical signals generated by the proximity sensor.

Yet another embodiment may take the form of a method of operating an electronic device. The electronic device may have one or more surfaces configured to provide housing I/O functionality and the method includes operating a proximity sensor to determine when objects are proximately located to one or more housing I/O surfaces the device. The proximity sensor is obscured at least in part by the housing of the electronic device and senses through the housing of the electronic device. One or more output devices may be actuated in response to the proximity sensor generating a signal indicating and object being proximately located to the one or more housing I/O surfaces. The one or more output devices are obscured by the housing of the electronic device and provide output via the housing of the electronic device.

DETAILED DESCRIPTION

Figures 1, 2, 3:
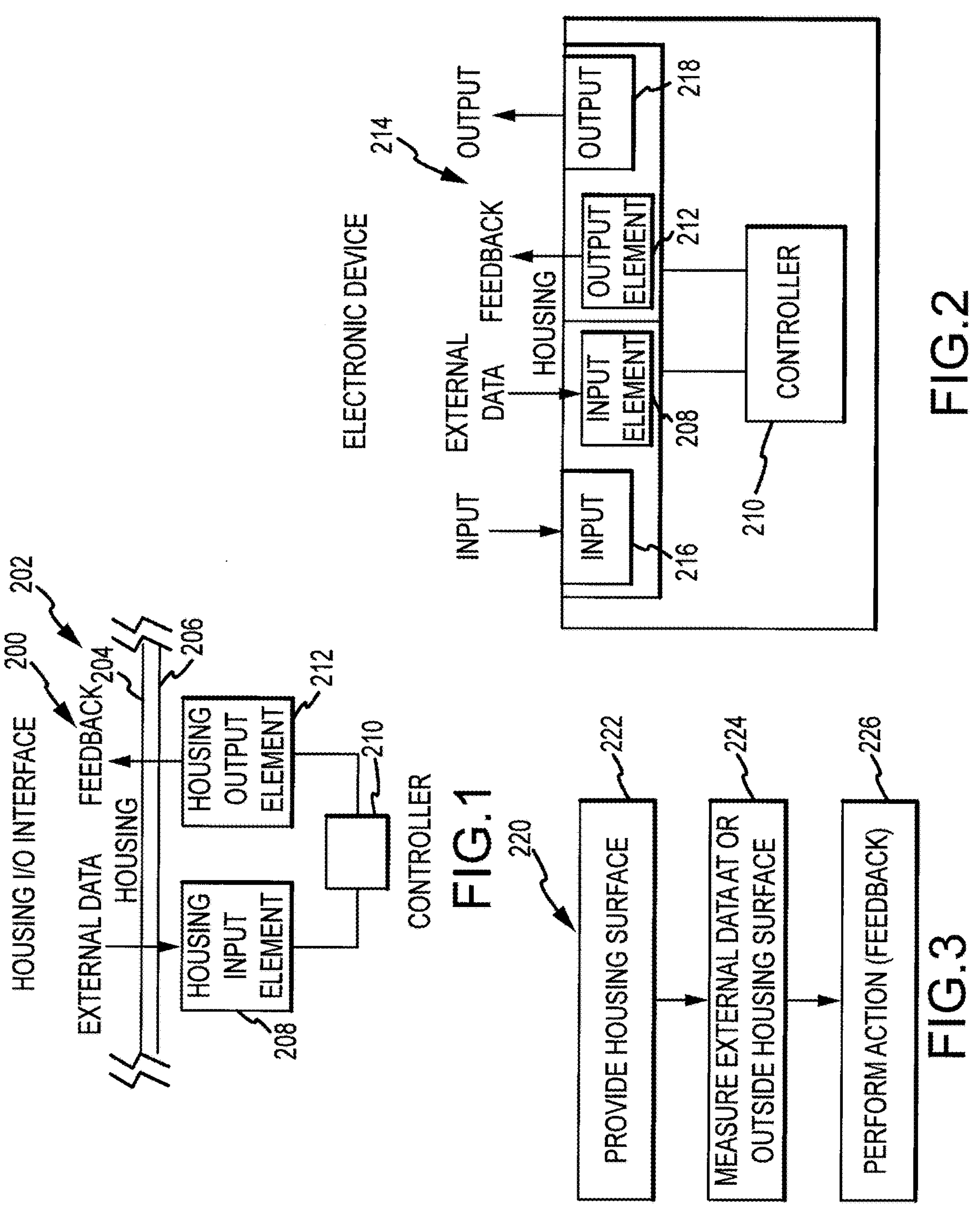
FIG. 1 is a simplified block diagram of a housing I/O interface.
FIG. 2 is a simplified block diagram of an electronic device implementing the housing I/O interface of FIG. 1 and convention input and output devices.
FIG. 3 is a flowchart illustrating a method for operating the electronic device of FIG. 2.

Generally, one embodiment takes the form of an electronic device housing providing I/O functionality. That is, the user interface forms part of the housing and the housing receives input and/or provides output for the device. Hence, the housing is part of the I/O system and certain inputs and/or outputs are not separate mechanisms from the housing. In particular, one or more surfaces of a housing are configured to accept user input and/or provide output when the device and/or the surface(s) is actuated. When not actuated, however, the surface(s) appears and functions like other surfaces of the housing that are not configured to provide I/O functionality. Specifically, the housing is configured to enclose and protect internal components as well as form the ornamental appearance of the device. It should be clear that the housing is the I/O and not a mechanism built through an opening in the housing. Hence, the sensors are obscured by the housing and visually imperceptible on outer surfaces of the housing. The surfaces of the housing receive and provide I/O. The I/O are no longer separate mechanisms situated in the housing.

In one embodiment, with regards to input, the housing is configured with one or more sensors. The sensors may be coupled directly to the housing, within the housing, or adjacent to a surface of the housing. The sensors are provided internal the outer periphery of the housing thus not impacting the surfaces of the housing. Specifically, the sensors are within the walls of the housing, adjacent an inner surface of the housing or contained within the volume of the housing like other internal components. User actions such as approaching, touching, tapping, holding, and/or squeezing may be detected and interpreted by the device as input. Using the sensors, the housing may be capable of proximity sensing, touch sensing, pressure sensing, and the like. Thus, the housing may be referred to and act as an input device. Various sensing technologies can be combined to provide enhanced inputs. For example, accelerometers may be used in combination with other sensing technology previously mentioned.

With regards to output, in one embodiment, the housing may be configured with display elements, such as light emitters, and/or haptic actuators, which can be associated with the sensors mentioned above. The light emitters may provide light to surfaces of the housing. In some embodiments, the surface of the housing may be made of microperforated material which may serve as the housing and which can cover an extended surface, i.e., an entire back surface of a housing, the entire enclosure surface, or specific locations about the surface of the housing. The haptic actuators may be located within the housing and provide vibration, pulse feedback, or other haptic feedback.

One or more specific embodiments are described in greater detail below with reference to the drawings and in the context of a computer system. However, the disclosed embodiments should not be interpreted or otherwise used as limiting the scope of the disclosure, including the claims. In addition, one skilled in the art will understand that the following description has broad application and the discussion of any particular embodiment is meant only to be exemplary and is not intended to suggest that the scope of the disclosure, including the claims, is limited to these embodiments.

FIG. 1 is a simplified block diagram of a housing I/O interface 200 having a housing wall 202. As shown, the housing wall 202 defines an outer surface 204, which may help form an exterior portion of an electronic device, and an inner surface 206, which may help form an interior portion of the electronic device. One or more housing input elements 208 are disposed within the outer periphery or exterior portion of the electronic device. By way of example, the one or more housing elements 208 may be disposed within the space defined by multiple walls (not shown), adjacent the walls, and/or embedded within an inner portion of the walls. The housing input element configuration may not affect the exterior portion of the housing wall 202 thereby keeping the sensors substantially hidden. The housing input element 208 may be situated at a portion of a wall, an entire wall, or multiple walls. Thus, the housing input element 208 may define an active area that may be over an extended surface of the wall 202, i.e., the entire back surface, the entire enclosure surface and/or select areas, i.e., specific locations about the surface of the housing. Furthermore, the active area may be localized or short range (touch or near touch) or extended or long range (substantially away from the surface). Specifically, the housing input element 208 is configured to receive external data via the wall 202. As such, input directed at an active area of the wall 202 is registered by the housing input element 208.

The housing input element 208 may be widely varied. For example, the housing input element 208 may correspond to touch sensors, pressure sensors, proximity sensors, etc. As such, the housing input element 208 may be interchangeably referred to as sensor or sensors. The housing input element 208 may operate alone or in conjunction with other sensors and/or input devices to extract the desired information from the surroundings of the electronic device. The sensors are configured to interact at the exterior portion or outside the outer periphery of the electronic device and generate electrical signals correlative with the interactions. The electrical signals generated by the housing input element 208 are provided to a controller 210 that is configured to interpret the electrical signals as input to the electronic device. The controller 210 may generate an output signal in response to the input. The output signal may be provided to an housing output element 212. The housing output element 212 may be disposed within the outer periphery or exterior portion of the electronic device and configured to provide output via the wall 202. The housing output element 212 may include display elements, such as light emitters, haptic actuators, speakers etc.

The housing I/O interface 200 may be implemented in a variety of electronic devices including, but not limited to, portable computing devices, cell phones, televisions, personal computers, smart phones, personal digital assistants, media players, appliances such as refrigerators, microwave ovens, etc. and any other suitable electronic device. As such, although the description included herein may include some specific embodiments and may be related to particular functions, it should be understood that the housing I/O interface may be implemented in a wide variety of devices and may perform a variety of functions beyond the embodiments specifically described herein.

FIG. 2 illustrates a simplified block diagram of an electronic device 214 implementing the housing I/O interface of FIG. 1. As shown, the electronic device 214 may include traditional input devices 216 and output devices 218 that may operate concurrently with the housing input element 208 and housing output element 212. The controller 210 may be configured to receive the inputs from the input devices 216 and the input elements 208, and may provide control signals to the output element 212 and the output devices 218. The traditional input devices 216 may include, for example, a keyboard, a mouse, a trackpad, etc. and the traditional output devices 218 may include, for example, a monitor, a speaker, etc. It should be understood that while appropriate accommodations (i.e. apertures, etc.) may located within the housing of the electronic device 214 for the conventional input and output devices 216 and 218, the surface of the device housing over the input element 208 and output element 212 is solid with no breaks. As such, the input element 208 and output element 212 are obscured by the surface and the surface appears to be a non-functional wall of the housing of the electronic device.

The information obtained from the one or more sensors of the input element 208 may be used to perform actions in the electronic device 214. Thus, the sensor and housing may be referred to as a housing user interface or housing input device. As should be appreciated, user actions such as approaching (proximity), touching, tapping, holding, squeezing relative to the housing may be used by the electronic device 214 to perform actions. Additionally, when combined together, these user actions can provide different levels of user input. For example, proximity may initiate a first user input, touching may initiate a second user input, and squeezing may initiate a third user input. Of course, sensor inputs may be combined to form a single input (e.g., proximity+touch=first signal, touch+squeeze=second signal, holding+orientation=third signal, etc.). Furthermore, the user actions that are interpreted as input by the housing I/O interface may be combined or otherwise used in conjunction with the input device 216 and/or output device 218 to provide an appropriate feedback or response to the user input.

The location of the sensors may be placed at strategic locations. For example, in one embodiment, sensors associated with adjusting sound may be placed proximate speakers, or sensors associated with light output of a display may be placed proximate the display or sensors associated with connectors may be placed proximate the connectors. In one embodiment, a tap on the housing surface near the speaker area of the electronic device may change the balance or volume of the speaker(s). In one embodiment, by touching a housing surface in the vicinity of a camera, a user may be able to turn on/off the camera as for example for a video conference (e.g., iChat). Basically, location based controls that are hidden from view can be created.

In one embodiment, a proximity sensor or touch sensor may be placed near a feedback indicator such as a sleep indicator. When a user approaches and/or touches, the sleep indicator or area around the sleep indicator, the electronic device may initiate a sleep or wake function. For example, if the electronic device is already in sleep, the user action may cause the computer to wake (or vice versa).

In one embodiment, a proximity or touch sensor may be used to detect areas around a group of connectors so that the connectors can be identified via a feedback mechanism (e.g., port identification). The feedback mechanism may be implemented via a display that identifies the nearby connector and possibly instructs the user to which cable/connector should be used, i.e., if the user places their finger near a USB connector, the display may present a window that indicates "USB". Alternatively or additionally, the housing may include indicators that present this information (see below). Alternatively or additionally, the feedback may be provided through speakers via a voice that says "USB".

In one embodiment, if large parts of the housing surface are touch enabled. A location context based user interface may be established. For example, if a user touches a surface an action may be applied to the closest enabled control. For example, touching near a power button may be interpreted as power button control, so a single touch may put the device to sleep while a double touch may turn it off.

In one embodiment, squeezing the device may be used as a control. For example, squeezing the device may be used to adjust the volume up and down. The actual control function may be associated with an application currently running on the device. For example, if the user is listening to music, then a squeeze may be used to adjust volume while if the user is reading something a squeeze may be used to zoom in and out. In one embodiment, squeezing left side of housing means one thing, while squeezing left means another thing. For example, squeezing the left hand side may decrease volume and squeezing the right hand side may increase volume.

In one embodiment, sensing where the user is holding a device and determining the orientation via an accelerometer or the like, the user interface may be rotated so that it is properly orientated for the user.

The electronic device 214 may be configured to provide output and/or feedback to a user. For example, in some cases this may be through conventional output devices 218 such as displays, speakers, etc. In other cases, this may be provided via the housing of the electronic device using through the output elements 212. By way of example, the output elements 212 may be disposed within the space defined by the walls of the electronic device 214, adjacent the walls, and/or embedded within an inner portion of the walls. The elements 212 configuration may not affect the exterior portion of the housing of the electronic device 214, thereby keeping the elements 212 substantially hidden. The elements 212 may be situated at a portion of a wall, an entire wall, or multiple walls of the electronic device 14.

The output elements 212 may work alone or in conjunction with other output elements (such as the conventional output device 218) to provide the desired information to the surroundings of the electronic device. In cases where the housing is used to output information, the output element and housing may be referred to as a housing user interface or housing output device. When integrated with housing, the output elements active area may be over an extended surface of the wall portion, i.e., the entire back surface, the entire enclosure surface and/or select areas, i.e., specific locations about the surface of the housing.

Like the sensors 208, the location of the output elements 212 may be placed at strategic locations. For example, output elements 212 associated with inputs may be placed proximate the input area. In one embodiment, a display element, such as a light emitter, may be located near a control actuators for devices, such as speakers for example. The light emitter may actuate when the speakers are operating to indicate that the speakers are operating. Additionally, the light emitters may indicate a volume of the speakers based on the intensity of the light emitted or, alternatively, by illuminating a larger area of the surface under which the light emitters are obscured.

In one embodiment, the housing surface may provide a keyboard and/or a trackpad and/or other controls that are activated for use depending on the user's needs. This embodiment may be referred to as a "virtual keyboard." The controls are invisible when not in use and become visible when in use. In this example, the sensors 208 may be used to detect taps or touches on the housing surface while an output element 212 such as a display or illumination element may be used to provide a control graphic on the housing surface. In one example, the top surface of the base of a laptop computer may be a single continuous housing surface with no or limited breaks (e.g., openings). It does not include a separate keyboard and/or touch pad situated therein. The top surface is free of one or both of these devices. In one example, the housing surface is made touch sensitive and is combined with illumination to indicate the keys and/or touch pad area.

In one embodiment, the keyboard is made visible by detecting the proximity of an object such as a hand or finger near the surface and not visible when the hand or finger is moved out of the active area of the proximity sensor.

In one embodiment, when device is in sleep mode, graphics within housing may be used to give limited information without waking the device up. For example, the housing may provide an indication of remaining battery life. Additionally or alternatively, the housing may provide an indication of a wireless communication signal strength. These indications may be visual, audible and/or haptic.

Figure 4:
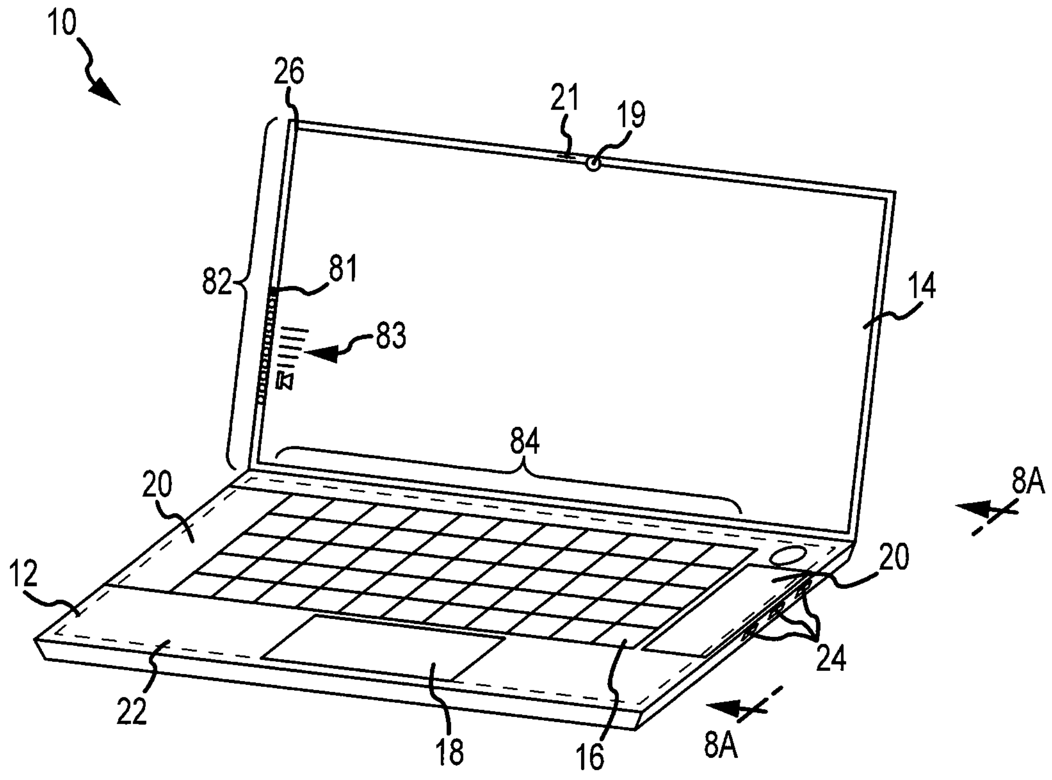
FIG. 4 illustrates a portable computing device with a housing that provides I/O functionality.

FIG. 3 is a flowchart illustrating a basic method of operation 220 for a device implementing the housing I/O interface. The method 220 includes providing a housing surface with which a user may interact, as indicated at block 222. The housing surface may be an external surface of a housing wall that appears as a non-operative surface. That is the surface appears just as other surfaces of the housing that do not provide input and/or output functionality to the device. The surface is continuous for portions of the housing that provide input/output functionality. External data at or outside the housing surface is measured via the surface, as indicated at block 224. The data is interpreted as input to the device and the device performs an action in response to the input, as indicated at block 226. In one embodiment, the action may include providing feedback to the user via the surface. Specifically, audible, haptic, or visual feedback may be provided to the user via the surface FIG. 4 illustrates an example portable computing device 10 having a housing 12 with integrated I/O. The portable computing device 10 may represent an example embodiment of the device 214 of FIG. 2, for example. The portable computing device 10 may include a display 14, a keyboard 16, a trackpad 18 and speakers 20. In some embodiments the device 10 may also include a camera 19 and/or a microphone 21. The display 14 and speakers 20 provide output to users and the keyboard 16, trackpad 18, camera 19, and microphone 21 allow users to provide input to the device 10. While generally providing structure to the device 10, the housing 12 may also provide I/O functionality.

The housing 12 may be plastic, metal, glass, or any other suitable material and/or any combination of materials. In some embodiments, the housing 12 may have small perforations (e.g., micro perforations) to allow light to pass through the housing 12. The small perforations may range in size from tens of microns to one millimeter, or any other appropriate size. The housing 12 includes a lower portion 22 that houses the keyboard 16, trackpad 18 and speakers 20. In one embodiment, the keyboard 16, trackpad 18 and speakers 20 may be positioned within the lower housing 22 and accessed via openings in the housing, as illustrated. The lower portion 22 may also include ports 24 for connecting the device 10 with other devices (not shown). An upper portion 26 of the housing 12 includes the display 14, camera 19 and microphone 21. The upper portion 26 may be mechanically coupled to the lower portion with a hinge (not shown). [0047] In addition to the I/O devices that are externally visible to a user, the housing 12 may have one or more sensors and/or actuators that are located within the housing (and hidden from view) that provide I/O functionality to the housing 12. Housing I/O is thus achieved. That is the housing 12 of the device is capable of functioning as an input and/or output device independent of conventional input/output devices. In housing I/O, the housing 12 does not appear to be an input/output device but, rather, simply appears to be a housing. There are no breaks in the housing 12 to provide for I/O and the surface of the housing used for I/O in housing I/O is continuous and of the same material as other portions of housing 12 that may not provide any I/O functionality. In one embodiment, there may be sensors and actuators lining the perimeter of the lower and upper portions 22 and 26 of the housing 12, as illustrated by the dashed lines. The sensors and actuators may be located near and/or coupled to the interior surface of the housing, thus facilitating a user's access to the housing I/O functionality. For example, the sensors and actuators may be located under the surface of the housing 12 partially containing the keyboard 16 and trackpad 18.

Figure 5:
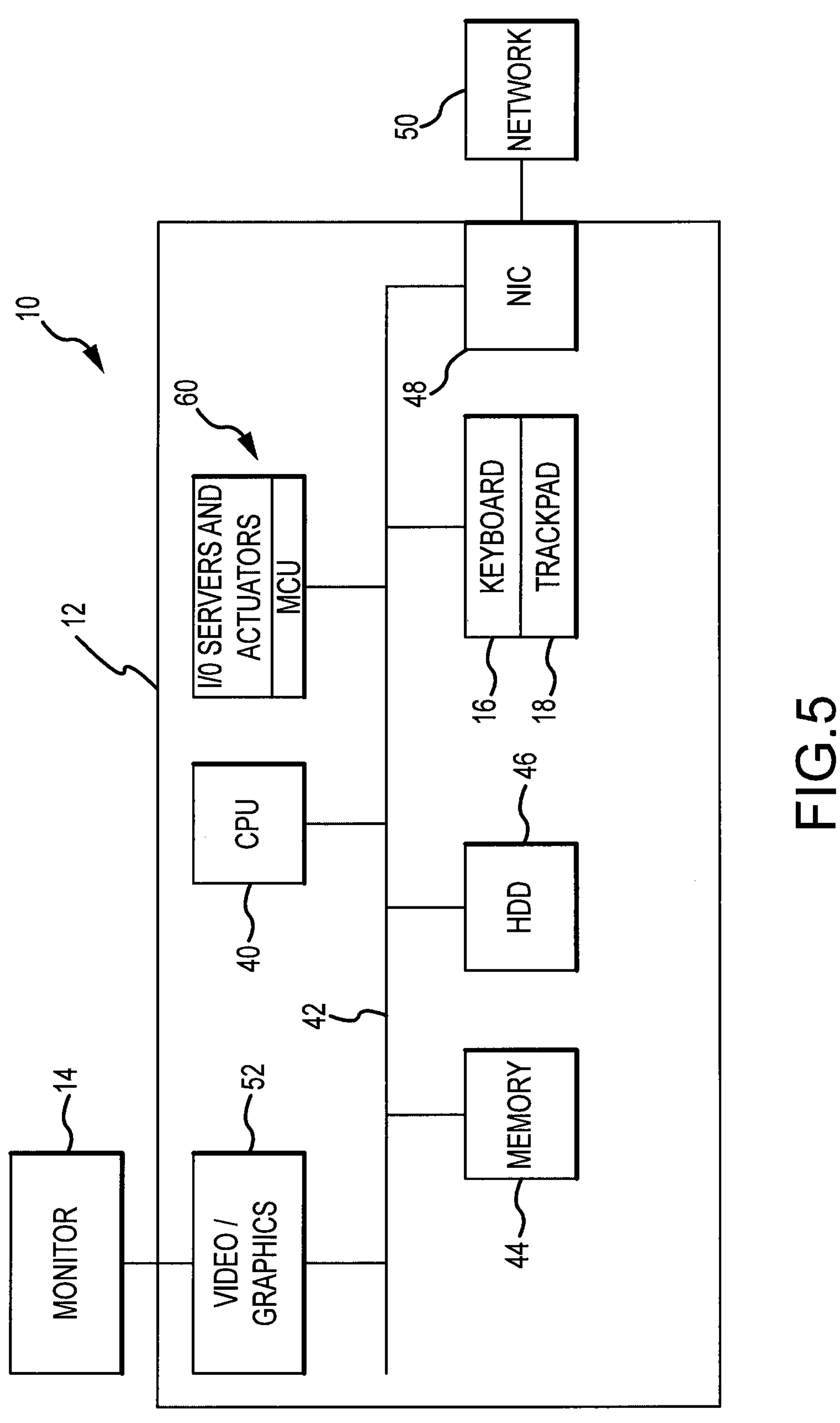
FIG. 5 is a simplified block diagram of the portable computing device illustrated in FIG. 1.

A simplified block diagram of the portable computing device 10 is illustrated in FIG. 5. As can be seen, the portable computing device 10 includes a central processing unit (CPU) 40. The CPU 40 may be any suitable microprocessor and may include one or more processing cores. As one example, in some embodiments, the CPU 40 may be a microprocessor manufactured by Intel, such as the 80X86, or Core 2 Duo®) processor, and may be configured to process data and execute applications and programs. Specifically, the CPU 40 may be configured to operate one or more operating systems, such as Mac OS X from Apple or Microsoft Windows, for example, and applications compatible with the operating systems.

The CPU 40 may be communicatively coupled to other component parts of the portable computing device 10. Specifically, in some embodiments, the CPU 40 may be coupled to other component parts of the portable computing system 10 via one or more busses. In some embodiments, the portable computing device 10 may have multiple busses coupled between the CPU 40 and dedicated chip sets, memory or device expansion slots, for example, such as a Northbridge chip, random access memory (RAM) and/or a PCI graphics board. Busses may also transmit data between chip sets, such as from the Northbridge chip to the Southbridge chip and vice versa. For the sake of simplicity, however, only a single bus 42 is illustrated.

The example bus structure 42 couples a memory 44, a storage memory 46, the display 14, the keyboard 16, the trackpad 18, and a network interface device 48 to the CPU 40. The memory 44 may be dynamic RAM, static RAM, or any other suitable type of memory including flash memory and read-only memory, for example. The storage memory 46 may be any suitable storage memory, such as a hard disk drive, semiconductor disk drive, tape drive, flash drive, etc. The storage memory 46 may store data, applications, programs, and/or an operating system. The network interface device 48 may be coupled to one of the aforementioned ports 24 and may allow for the portable computing device 10 to communicate with other devices over a network 50. The display 14 may be coupled to the bus 42 via a video/graphics device 52 that may include dedicated memory and processor for processing graphics for the display 14. It should be understood that some embodiments may include more or fewer components and may be configured in a variety of different ways.

The bus 42 may also couple I/O sensors and actuators 60 to the CPU 40. The I/O sensors and actuators 60 may be positioned throughout the housing 12 to receive input and provide output for the device 10. In particular, the sensors and actuators 60 may be located within the housing 12 in particular regions of the housing 12 or under particular regions or areas of the housing 12 to provide a specific or general housing I/O functionality. The sensors and actuators 60 may be coupled to one or more walls of the housing 12, integrated into the housing 12, or within an interior defined by the housing 12.

Figure 6:
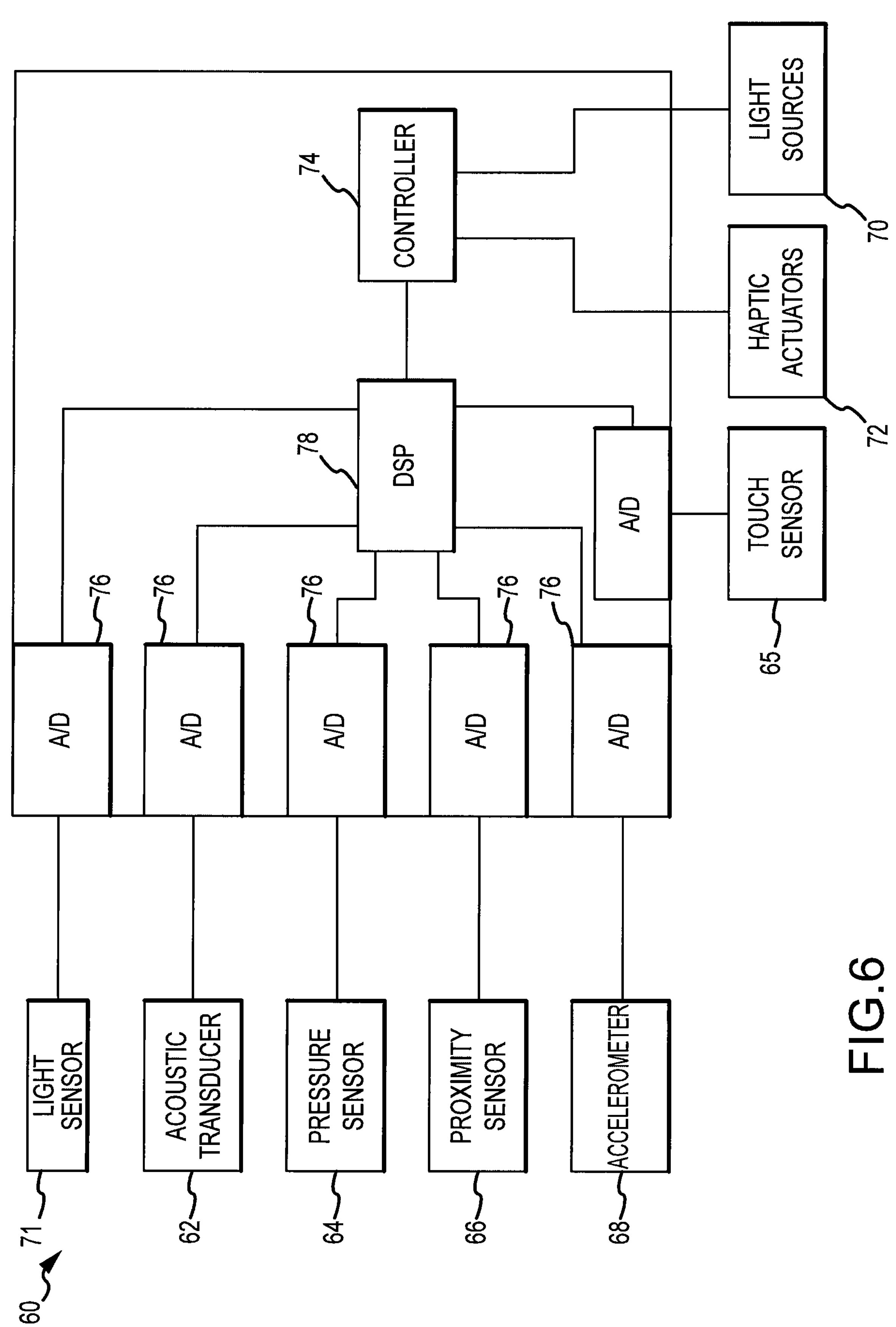
FIG. 6 is a block diagram of sensors and actuators that may be implemented in the portable computing device of FIG. 1.

FIG. 6 illustrates a block diagram including one or more I/O sensors and/or actuators 60 that may be implemented for the housing 12 to provide I/O functionality. As shown in FIG. 6, the I/O sensors and actuators 60 may include acoustic transducers 62, pressure sensors 64, touch sensors 65, proximity sensors 66, accelerometers 68, light sources 70, Light sensors 71 and haptic actuators 72, for example. The acoustic transducers 62 may be, for example, microphones and/or speakers. Microphones may be used to sense when a user taps, scratches, or otherwise touches surfaces of the device 10 housing 12 and speakers may be used to provide audible feedback to a user. The pressure sensors 64 may include capacitive sensors, strain gauge sensors, piezoelectric sensors, resistive sensors, etc. and may be used to determine when a user presses or applies pressure to the housing 12 of the device 1.0. The proximity sensors 66 may include ultrasonic sensors, IR sensors, photosensitive sensors, capacitive sensors, inductive sensors, etc. and are operated to determine when objects, such as users fingers and/or connectors are near the device 10 or a surface of the device 10. The light sources 70 may include light emitting diodes (LEDs), organic LEDs, incandescent light sources, etc. that are actuated to output light that is generally visible to users. The light sensors 71 may include photosensitive diodes, photosensitive transistors, etc. The haptic actuators 72 may include vibration actuators, pulsing actuators, etc. that are actuated to provide touch feedback to users. The accelerometers 68 may include accelerometers and other devices to determine direction such as magnetometers or compass chips, for example. Data provided from the accelerometers 68 may be used in combination with input received from other sensors to determine conditions of use, such as if the user is holding the device, for example, and may be used to provide feedback to a user and/or auto configure the operation of the device 10, as discussed in greater detail below.

The I/O sensors and actuators 60 may be controlled by a microcontroller unit ("controller") 74. The controller 74 may be any suitable controller such as a model 8742 manufactured by Intel Corporation, or a PIC16F84 manufactured by Microchip, Inc. Additionally, in some embodiments, the controller 74 may be part of a larger integrated circuit having one or more microprocessors operating as master controllers and one or more microprocessors operating as slave controllers to the master controllers. Accordingly, the controller 74 may be configured to operate in either master or slave modes depending on the particular application and configuration. The microcontroller 74 may include hardware and/or software to control actuation and operation of multiple I/O sensors and actuators described in greater detail below. Additionally, the controller 74 may be communicatively coupled to the CPU 40 or other component parts of the portable computing device 10.

Electrical signals generated by sensors may be converted to digital signals by analog-to-digital converter 76. The digitized signals may further be processed by a digital signal processor (DSP) 78 before being passed to the controller 74. Any general of special purpose (specialized for processing a particular sensor type output) DSP chip can be used. In an alternative embodiment, DSP algorithms may be executed by the CPU 40 itself. In other embodiments, no DSP 78 is used. Rather, the digitized signals may go directly to the controller 74, or to the processor 40, which may further process the signals.

The I/O sensors and actuators 60 may be positioned throughout the housing 12 and configured to enhance a user's experience with the device 10. In particular, the I/O sensors and actuators 60 may be configured to receive input from a user's interaction with the housing 12 and/or provide output to a user. For example, pressure sensors 64 and/or touch sensors 65 may be located underneath a bezel portion of the upper housing to sense user interactions with the bezel. Additionally or alternatively, pressure sensors 64, touch sensors 65, proximity sensors 66 and/or acoustic transducers 62, etc., may be located underneath a surface of the lower housing 22 to sense user interactions with the lower housing 22. In some embodiments, the sensors may generate signals (input) that may be used to control applications operating on the device.

In other embodiments, the signals may be used to control the operation of output devices, as will be discussed below. In particular, the signals received from housing sensors in housing I/O may actuate output devices and/or adjust output parameters of output device. Further, specific types of housing I/O input may be used to control particular functions of the put devices.

In one embodiment, for example, pressure sensors 64 or touch sensors 65 may be positioned near the speakers 20 to determine when a user touches or applies pressure to the housing 12 near or over the speakers 20. The sensed touch or pressure may be converted into an electrical signal and used in a number of ways to provide a desired effect. In one embodiment, the sensing of touch or pressure being applied to the housing 12 near the speaker 20 may turn on and/or turn off the speaker 20. Specifically, the pressure sensor 64 may generate an electrical signal correlative to the amount of pressure being applied over a period of time. In the case of turning on and off the speaker 20, the generated signal may be an impulse signal that lasts only a fraction of a second resulting from the user simply tapping a surface near the speaker 20. In another embodiment, a more prolonged applied pressure or touch may adjust the volume of the speaker. For example, if the touch or pressure is applied for one or more seconds the generated signal will be interpreted to adjust the volume. If the pressure exceeds a threshold level for one or more seconds, then the volume may be adjusted upward, whereas if the pressure is below the threshold the volume may be adjusted downward. In yet another embodiment, if the pressure or touch is applied over multiple time periods, such as for a period of three of more seconds, for example, and the pressure or touch is relatively consistent (i.e., no impulses) it may be determined that the pressure or touch is from being held and the pressure or touch may be discounted when interpreting signals from received from the pressure sensor 64. Other signals generated from other types of sensors may similarly be used to achieve similar functionality in speakers or other devices.

For example, other types of devices such as a camera and microphone may be similarly operated based on signals generated from sensors that are subsequently interpreted by a processor. The sensors may be located in areas of the housing adjacent to the camera and microphone. For example, in one embodiment, a pressure sensor or touch sensor may be located in the housing 12 near the camera to sense interaction with the housing near the camera. In response to touch or pressure being applied to the housing 12 near the camera, the touch sensor or pressure sensor generates an electrical signal that is directed to the processor which may interpret the signal and generate an output signal in response to the signal. As such, in response to touch or pressure being applied, the processor may output a signal to turn on or turn off the camera. Further, in another embodiment, an application operating on the computing device 10 may be used to interpret an input. For example, if a video chat program is currently operating, touch or pressure sensed near the microphone and/or camera may activate or turn off the camera and/or microphone.

In another embodiment, a portion of the housing 12 that forms a bezel 80 for the display 14 may have acoustic transducers 62, pressure sensors 64, touch sensors 65, and/or proximity sensors 66 located underneath its surface. The sensors may be used to receive a variety of user input. Returning to the speaker example, the sensors located in the bezel 80 may form a sensor region 82 that may be used to control the volume of the speakers 20 and/or provide user feedback. In one embodiment, a first side (such as the left hand side 82) of the bezel 80 may have sensors 81 configured to determine when pressure is applied to the bezel 80 or when the bezel 80 is touched. In one embodiment, for example, upward movement of the pressure or touch on the bezel 80 may increase the volume while movement downward may decrease the volume. Specifically, an initial touch or pressure on the bezel 80 may result in one or more sensors generating an electrical signal. As the pressure or touch moves upward along the bezel 80, sensors in the path of movement will generate increasingly stronger signals, while sensors from which the movement is away will generate weaker signals. The signals of all the sensors may be provided to the processor which may interpret the increasing and decreasing signals as indicating a user's intent to increase the volume and generate an output signal to adjust the volume upward.

Additionally or alternatively, the amount of pressure may act as a command to increase or decrease the volume. Further, in some embodiments, in response to pressure being applied, tapping on the bezel 80 (detected using acoustic transducers 62), or proximity of objects to the bezel 80 (sensed by the proximity sensors 66) icons or graphics may appear on the display 14 and/or on the bezel surface 80. The graphics may correlate to a particular function that may be controlled by the sensors located in the bezel 80. For example, as shown, the display 14 may show a graphical representation 83 of a speaker with bars indicating a volume level. The graphic may be translucent and overlay images that are concurrently shown on the display 14. Other operations may similarly be controlled by obtaining data from sensors located in the bezel 80 and the processor interpreting the data and providing an output signal to effectuate an output to the user. For example, in one embodiment, a lower portion 84 of the bezel 80 may include sensors (not shown) to provide sensor data that may be used to control the brightness of the display 14.

Figure 7:
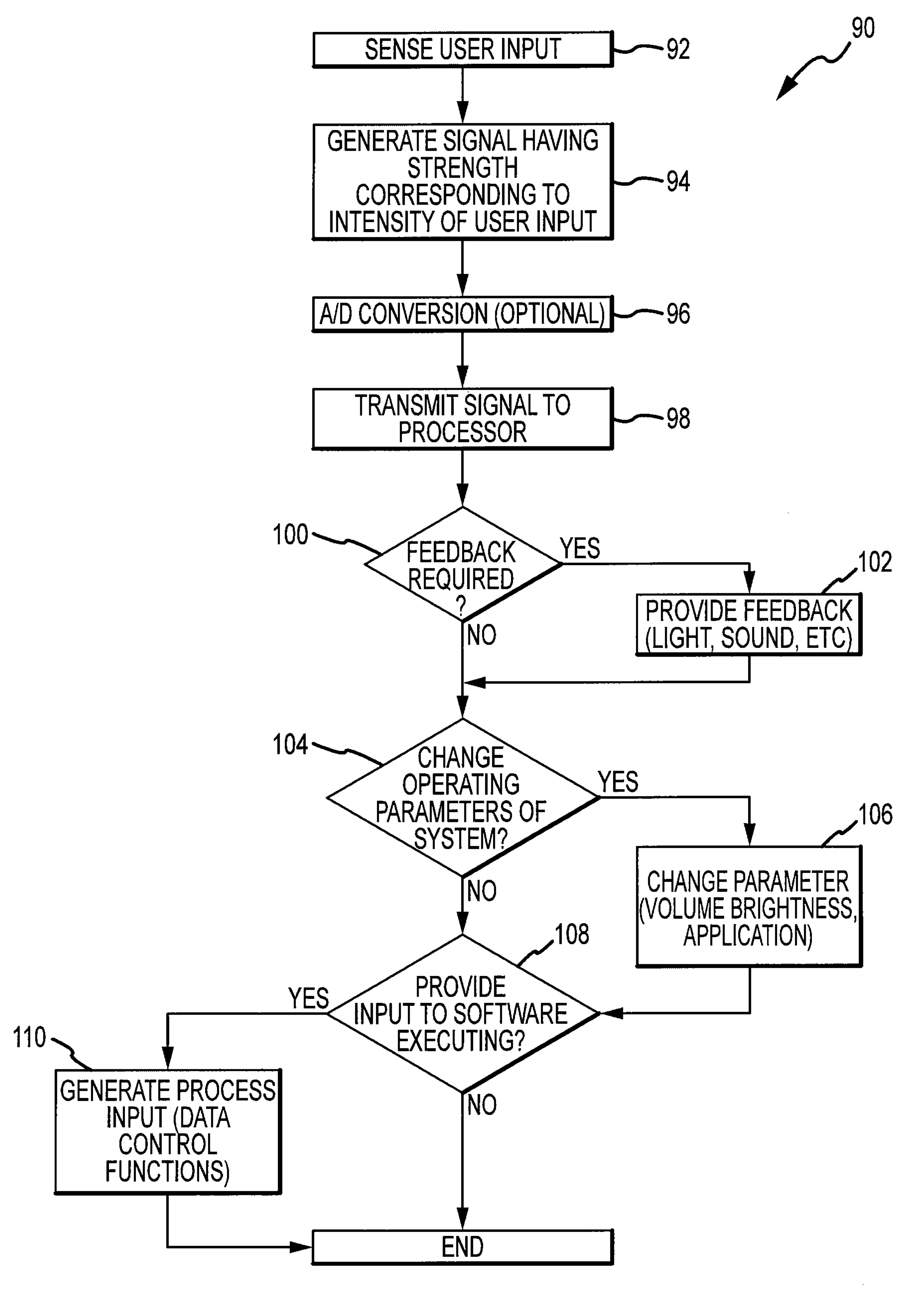
FIG. 7 is a flowchart illustrating a technique for operating the housing of the portable computing device of FIG. 5 as an I/O device.

FIG. 7 is a flowchart illustrating a technique 90 for operating the housing 12 as an I/O device. In particular, the technique 90 may begin by the housing 12 sensing user input, as indicated at block. 92. Upon sensing the user input, the housing 12 (or a sensor coupled to the housing 12) generates a signal corresponding to the user input, as indicated at block 94. As previously discussed, in some embodiments, the generated signal may be correlative to the intensity of the user input. That is, the stronger the user input, the stronger the generated signal will be.

The generated signal may be converted to a digital signal, as indicated at block 96, and transmitted to a processor, as indicated at block 98. The processor may then interpret the generated signal. Interpretation of the generated signals may include determining the type of user input, where the user input is coming from, i.e., what part of the housing, the strength of the generated signal, and how long the signal lasts, to determine what the generated signal means. After interpreting the data, the processor determines whether feedback should be generated based on the user input, as indicated at block 100, and may generate a signal to provide feedback, as indicated at block 102.

In addition to or instead of providing feedback, the processor may determine whether an operating parameter of the system should be changed in response to the user input, as indicated at block 104. If it is determined that the user input is intended to change an operating parameter, the parameter may be altered, as indicated at block 106. The alteration of an operating parameter of the system may include adjusting the volume of speakers or the brightness of the display, turning on or off devices (e.g., camera, microphone, speaker), initiating an application, etc.

After the operating parameters have been adjusted or if no change to operating parameters is warranted based on the user input, it may be determined if input should be provided to a software that is executing, as indicated at block 108. If it is determined that input should be provided to executing software, the processor may generate process input, as indicated at block 110. For example, in the event that a media player application is operating on the system, interactions such as pressure, touch, etc. on particular locations of the housing 12 may result in the processor generating input to the application such as input to control the operation of the application including, for example, providing input to skip, stop, play, reverse, pause, etc. the media that is being played by the media player application. In another embodiment, the input may be provided in the form of a keystroke, for example.

It should be understood that the technique 90 illustrated in FIG. 7 is merely provided as an example. In some embodiments, the order of executing the various steps may be different and may include more or fewer steps and/or different steps. Additionally, the technique 90 may be iterative and it should be understood as being applicable to one or more sensors and/or sensing technologies. For example, in a first iteration, generated signals from a proximity sensor may result in a first output (i.e. the lights being actuated) and subsequently generated signals from a pressure sensor may result in a second output such as adjusting the volume.

Figure 8A:
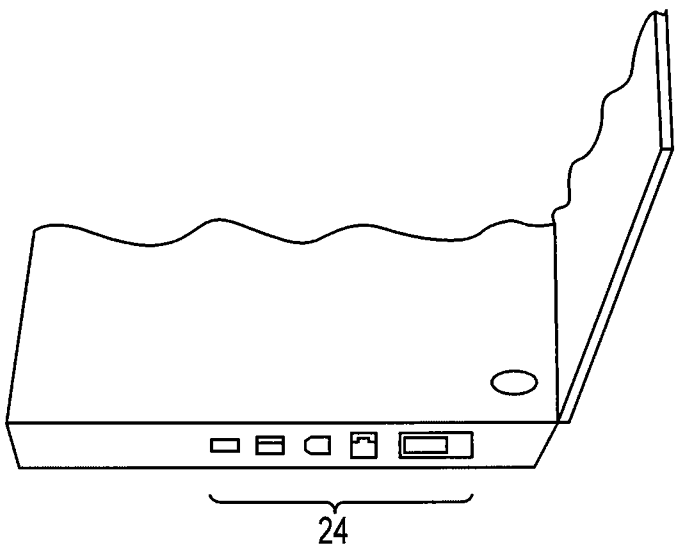
FIGS. 8A and 8B illustrate a partial side-view of the housing of the portable computing device of FIG. 4.
Figure 8B:
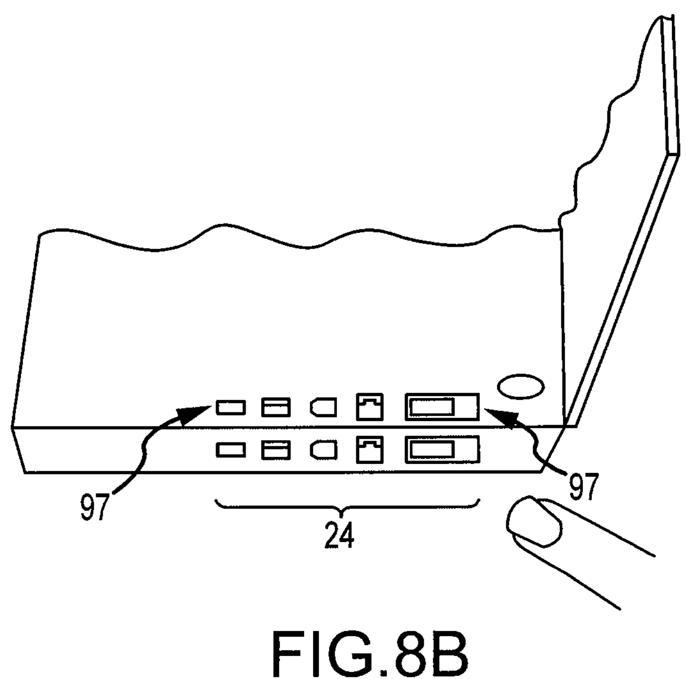

FIGS. 8A and 8B illustrate an example embodiment implementing the technique illustrated by the flowchart of FIG. 7. In FIGS. 8A and 8B, proximity sensors 66 may be located in the housing 12 near the ports 24 to detect when objects approach the ports 24. As shown in FIG. 8A, when no object is detected as being near the ports 24, there is no output/feedback provided to a user and the surface of the housing appears to be a non-functional wall, as there are no breaks in the housing surface for input or output devices.

In response to sensing the user input, i.e., an object approaching the ports 24, the proximity sensors 66 may generate a signal. In some embodiments, the generated signal from the proximity sensors 66 may be larger or smaller depending on how close to the ports the user (or an object) is. Generally, however, interpretation of the input sensed by proximity sensors 66 interpretation may be straightforward, as the device 10 may be configured to simply provide feedback when objects are within a particular distance, e.g. a few inches, from the ports 24. The strength of the signal generated by the sensor 66 may be used to determine the distance of an object from the ports 24. Specifically, if the signal provided to the processor exceeds a determined threshold signal strength above which it has been determined indicates an object being within a certain distance from the ports 24, the processor may determine to provide feedback. For example, upon sensing an object near the ports 24 and generating a signal that exceeds the threshold, the processor may generate an output signal to light sources (not shown) so that icons 97 may be illuminated or may otherwise appear on a top surface of the housing 12 to indicate the location and types of ports that are located on the side of the housing 12, as shown in FIG. 8B.

The surface of the housing 12 may be a microperforated surface that allows light to pass through the surface. In another embodiment, the housing 12 may be sufficiently thin where light output is to be provided so that light may shine though the housing surface. When not illuminated, the surface of the housing 12 may appear to be the same as other surfaces of the housing 12 that do not provide I/O functionality. The icons 97 may have the same orientation as the actual ports 24 to aid in coupling connectors to the ports 24.

In other embodiments, there may be multiple thresholds provided and time may be factored into the determination as to whether feedback will be provided or whether feedback should be ceased. For example, a first threshold may be used to determine when an object is within a few inches of the ports and a particular feedback may be provided, such as a speaker or light being actuated to provide feedback to a user. As the generated signal may increase as the object moves closer to the ports 24, one or more additional thresholds may be provided for altering the feedback provided. For example, if the second threshold is exceeded, the feedback may increase in intensity (e.g., the intensity of light output may increase). In yet another embodiment, a linear or continuous tracking of sensor signal can be applied. That is, the amount of actuation or variation of operation parameter can be proportional to the strength of the signal. Additionally, if it is determined that an object has been near the ports 24 for an extended period of time, e.g. more than a few seconds, the feedback, such as light output, may cease. It should be understood embodiments related to other functions may implement multiple thresholds to help fine adjust parameters, such as volume, brightness, etc.

Figure 9A:
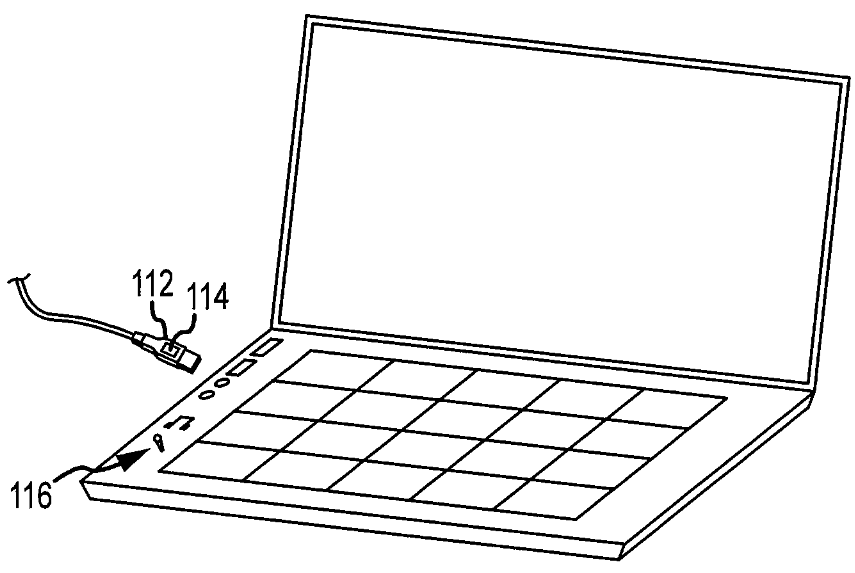
FIGS. 9A and 9B illustrates an embodiment configured to sense a radio frequency identification tag located on a connector.
Figure 9B:
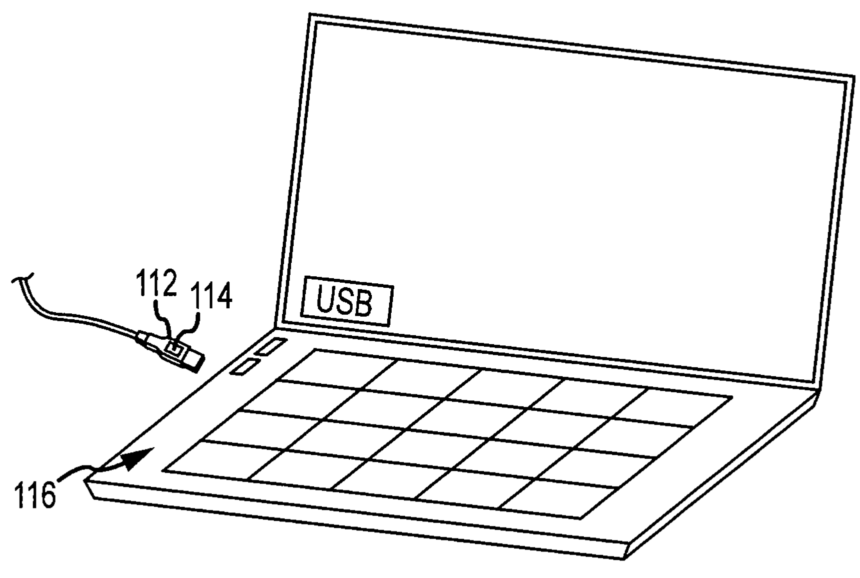

Turning to FIGS. 9A and 9B, an alternative embodiment is illustrated wherein a connector 112 may be configured to identify itself to the system 10 as it approaches a port or a bank of ports. Specifically, in one embodiment, the connector 112 may be equipped with a radio frequency identification ("RFID") tag 114. The RFID tag 114 may be active or passive. In one embodiment, the device 10 may poll for RF input, such as input received from the RFID tag 114 on the connector 112. In another embodiment, the device 10 may seek for RF signals only after sensing an object in proximity to the ports as determined using proximity sensors including RF, IR, inductive, and/or capacitive sensing technologies. The RFID tag 114 may provide identifying information, such as: the type of connector; type of device that is coupled to the connector 112; device ID; etc. In other embodiments, the RFID tag 114 may simply provide a serial number or other identifier that may allow for identification by the device 10 using a lookup table or other technique. One or more icons or lights 116 may be illuminated to indicate a corresponding and/or available port. In one embodiment, only the icon representing a corresponding port is illuminated, as indicated in FIG. 9B. Additionally or alternatively, the port may be identified on the display of the device, e.g., "USB." Additionally or alternatively, the device may provide an audible output indicating the port type. For example, the device may verbally state "USB" or may simply provide a beep or other audible signal to indicate a particular port. In another embodiment, the icon of the corresponding port is illuminated with a color such as green and other icons may be illuminated another color, such as red, to indicate they do not correspond to the connector. In yet another embodiment, the corresponding port graphic may be illuminated more brightly than non-corresponding ports.

It should be understood that a variety of different icons 116 or images or light patterns may be provided. As described above, the icons may appear like the ports themselves. While this maybe valuable in helping the user to orient the connector, in some cases, the ports may tend to look confusingly similar. As such, it may be useful to so iconic representations for the ports using a port logo (typically appears on the enclosure). This may be particularly useful for ports like the headphone/microphone ports, which otherwise look identical. Alternatively, the name of the port may be provided on the surface in conjunction with the port symbol or instead of the symbols.

In yet another embodiment, the icons 116 may be controlled by a "set up assistant" software or other software related setting up the computer or connecting a device. The set up assistant software may be used to guide a user when setting up a computer for the first time. For example, when the computer is first started up (i.e., turned on for the first time by a user), the set up assistant may ask for a mouse and/or keyboard to be connected and may illuminate the appropriate port icons, such as the USB icons, for example.

Turning to FIG. 1A, another portable computing device 120 is illustrated in accordance with an alternate embodiment. As illustrated, the portable computing device 120 includes a substantially smooth surface 122 rather than the conventional keyboard 16 illustrated in the portable computing device 10 of FIG. 4. The surface 122 is part of the housing 124 of the computing device 120 and does not include a separate device built through the housing. As such, the surface is continuous extending without breaks, lines, gaps, etc. The housing 124 includes sensors and actuators 126 shown as dashed lines in FIG. 10B that enable the surface 122 to act as an input device for the computing device 120. Stated more specifically, sensors and actuators 126 are provided underneath the surface 122 and may provide a virtual keyboard (i.e., an input device that imitates the functionality of an actual keyboard but does not appear to be a keyboard unless activated).

The sensors and actuators 126 may be arranged in a variety of configurations. As illustrated, the sensors and actuators 126 may be arranged into sensor/actuator packages 128 that each may include one or more sensor and one or more actuator. Additionally, the sensors and actuators 126 may be generally arranged in an array pattern or in a pattern that mimics an actual keyboard. In one embodiment (not shown) sensors may be arrayed such that the entire area of the surface 122 may operate as an input device. In other embodiments, sensors may only be provided under defined areas of the surface 122. For example, the sensors may be provided under an area that approximates the size and dimensions of a keyboard and/or trackpad and there may be a one-to-one correlation between the number of sensors provided and the number of keys in a conventional keyboard. In yet another embodiment, there may be fewer sensors than light sources located under the surface 122. For example, there may be provided an array of light sources and sensors may only be provided in between two or more of the light sources. For example, sensors may be provided between two light sources or in the center of three light sources arranges in a triangle in the array or in the center of four light sources arranged in a parallelogram in the array. Determination as to where the surface 122 was struck (and what keystroke to register) may be achieved through comparative tracking or other suitable techniques. In one embodiment, the position touched by a user may be determined based on relative amplitude of electrical signals generated by sensors and/or triangulation or other localization technique of those sensors that generated the strongest signal.

Figure 10A:
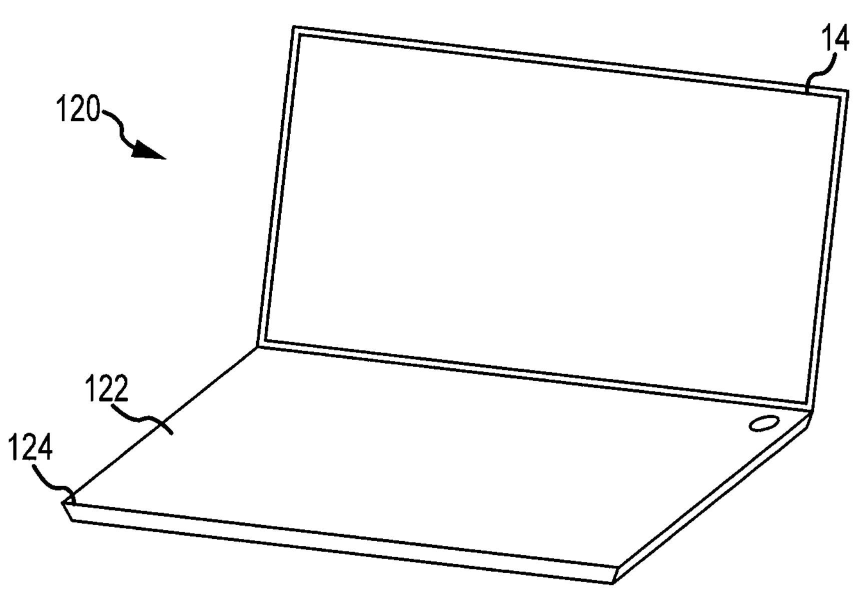
FIGS. 10A and 10B illustrates a portable computing device having a virtual keyboard in accordance with an embodiment.
Figure 10B:
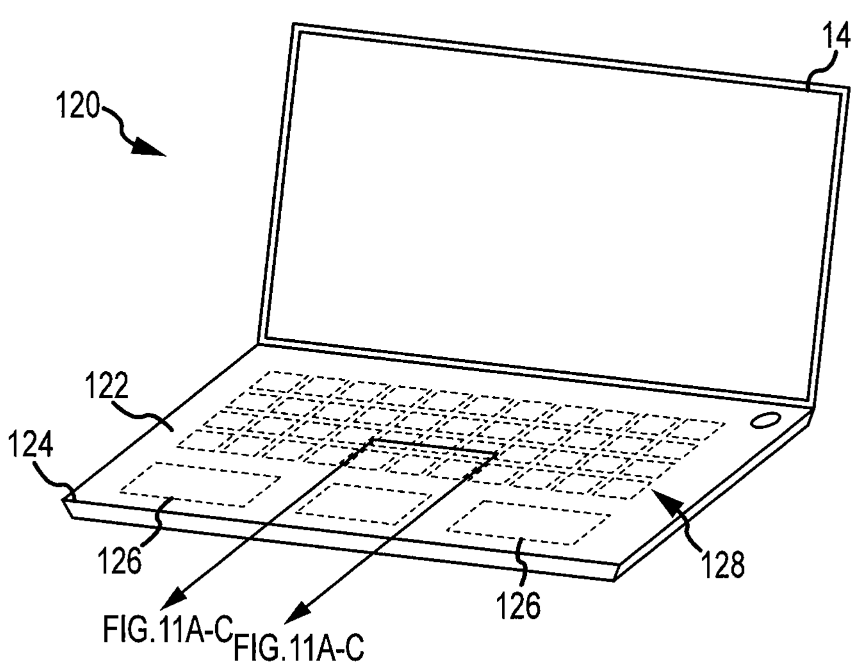
Figure 11A:
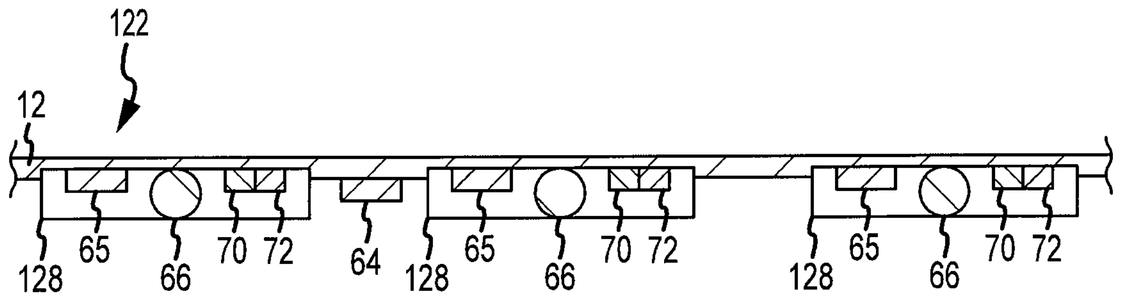
FIGS. 11A-11C are cross-sectional views of sensor/actuator packages that may generally be related to the portable computing device of FIG. 10A.
Figure 11B:
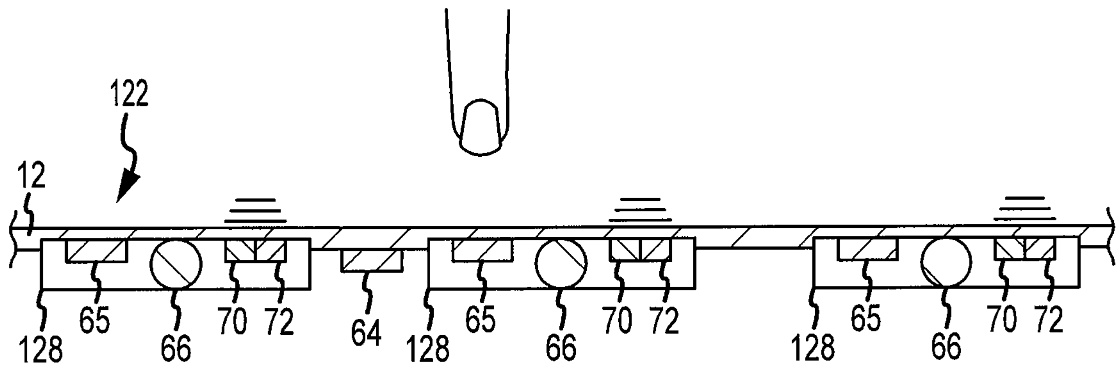
Figure 11C:
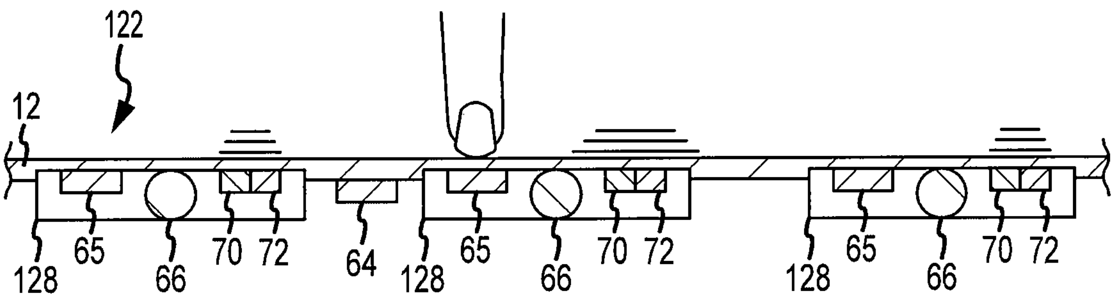

A simplified cross-sectional view of the surface 122 and example sensor/actuator packages 128 that may generally correspond to the keyboard illustrated in FIGS. 10A and 10B is shown in FIGS. 11A-11C. As shown in FIG. 11A, the sensor/actuator packages 128 may include a touch sensor 65 and/or a pressure sensor 66, light sources 70, and/or a haptic feedback device 72. A proximity sensor 64 (which may be implemented as an acoustic, light, inductive, capacitive, magnetic, or IR based sensor, for example) may be used to determine when objects are in close proximity. Although sensor/actuator packages 128 may include proximity sensor 64 in the illustrated embodiment, only a single proximity sensor 64 is provided for the entire surface. Alternatively, several proximity sensors 64 may be strategically positioned under the surface to reasonably determine when an object is near or over the surface. As such, the proximity sensor 64 may be positioned regionally in between the sensor/actuator packages 128 or in only one or a few sensor/actuator packages 128.

In one embodiment, as illustrated in FIG. 11B, upon sensing an object in close proximity to the surface 122, the light sources 70 and haptic feedback device 72 may activate. In one embodiment, the light sources 70 may illuminate to indicate a keyboard configuration. For example, in one embodiment, the light sources may illuminate to show a QWERTY keyboard configuration. Additionally, in some embodiments, the haptic device 72 may begin to vibrate at a low amplitude. The vibration creates a "live" surface, thereby providing a different tactile effect to users touching the vibrating surface 122 as compared to a surface that is not vibrating. In one embodiment, the live surface may include an area that approximates the size and location of a conventional keyboard, for example. In other embodiments, the live surface may include on a small area of a larger surface or may cover an entire contiguous surface through which user input may be provided. Additionally, while embodiments of the haptic feedback device 72 have been described as operating in a "vibration" mode, in other embodiments, the haptic feedback device 72 may provide other types of feedback. For example, the haptic feedback device 72 may provide mechanical, electromechanical, electromagnetic, piezo, acoustic, thermal, pneumatic, microfluidic, etc. modes that may provide various other types of haptic feedback.

As more than one pressure sensor 66 or touch sensor (not shown) may detect a touch of the surface 122, the location of the touch may be determined based on the relative size or amplitude of the signal generated by the sensed pressure between the different sensors. That is, the pressure sensor 66 located the closest to where pressure is applied will register the largest sensed pressure. In another embodiment, the location of the touch may be determined by using at least sensors that register the touch to triangulate the most likely position of the touch on the housing surface. Additionally, signals registered by more than one sensor type may be used in combination to determine the location that surface 122 is touched. For example, proximity sensors, touch sensors, pressure sensors, and/or acoustic transducers may generate signals that may be used together to determine the most likely location the surface 122 was touched.

Upon determining the position of the surface 122 that is touched, the haptic device 72 located nearest the location may be pulsed to provide a higher amplitude vibration than the other haptic actuators, as shown in FIG. 11C. The higher amplitude vibration provides feedback to a let a user know that the applied pressure has registered a keystroke. In another embodiment, the haptic device 72 may operate in conjunction with a speaker (not shown) so that audible feedback is also provided to a user. In one embodiment, only the haptic device 72 may be active. Furthermore, in order to provide timely haptic feedback, proximity sensors may generate signals in anticipation of contact with the surface 122 that may help to determine where the surface 122 is to be touched.

It should be understood that in other embodiments, different sensors and actuators, as well as different combinations of sensors and actuators may be implemented to achieve a desired effect. For example, in one embodiment, the actuator/sensor package may include an organic LED configured to emanate light through the microperforated surface 122 when the proximity sensor senses objects in close proximity or if pressure on the surface 122 is sensed by the pressure sensor, for example. As such, the keyboard may be "hidden" until one or more of the sensors determine that a user is interacting with the surface 122.

Additionally or alternatively, in one embodiment the surface 122 may operate as a configurable or customizable input surface. Specifically, the output provided on the surface (i.e., lighted symbols, graphics, icons, etc.) may be modified according to a particular environment in which the portable computing device 120 is operating or applications operating thereon. As the output of the surface 122 changes or is changed, input sensed on the surface 122 is correspondingly interpreted differently. Specifically, in one embodiment, if the computing device 120 is operating a media application to provide media content to a user, such as media from a DVD or other source, a row of sensor/actuator packages may change from their default functions, such as operating as function keys (e.g., F1 key, F2 key, F3 key, etc.), to function as controls for operating the media application. A play button, a rewind button, a fast-forward button, a pause button, a stop button, a menu button, etc. may be provided rather than function keys on the surface 122 and the actuation of the buttons will effectuate the operation of a play button, a rewind button, and so forth, rather than the operation of a function key.

In yet another alternative embodiment, a user may configure the surface 122 to a custom configuration. The system 120 may be configured to operate in an operating mode and a configuration mode. The system 120 may be placed in a configuration mode by initiation of configuration software, actuation of a hardware or software switch, or any other suitable manner. Once in the configuration mode, a user may define portions of the surface 122 to provide specified input to the system 120. For example, the configuration mode may provide an application in which a user can manipulate how touching or applying pressure to certain areas of the surface 122 are interpreted.

In one embodiment, while in the configuration mode, a user's finger may touch the surface 122 to select a particular portion of the surface that has been defined to provide a particular input (for example, the user may touch a region of the surface 122 that has been defined to function as a number pad). The user may then drag the finger across the surface 122 to a desired location on the surface 122 and remove the finger. The surface 122 then reconfigures such that the region in which the finger was removed from the surface 122 has been redefined to provide input signals of the location that the finger originally touched, i.e., the number pad. In another example, the user may move the controls for volume to a desired location on the surface 122. In another embodiment, the application may simulate the surface 122 on the display 14. The simulated surface may provide a map of the current surface configuration and the user may manipulate the simulated surface to re-configure how input from the surface 122 is interpreted by the system 120.

Once the user has reconfigured the surface 122, the configuration may be saved in memory of the system 120 and the surface 122 may operate in accordance with the reconfiguration. In the reconfigured state, light sources that provide output indicative of the input provided by a particular the surface 122 to the system 120 may reflect the reconfigured state. For example, if the number pad has been dragged from the right side of the surface 122 to the left side of the surface 122 in the reconfiguration, the light sources on the left side will cause a number pad to appear on the left side of the surface 122. In one example, an OLED based light source underneath the surface would show a reconfigured image in a new location. In another example, an image on a main computer display may show a surface map with indication of where the new number pad is located on the surface 122.

Figure 12A:
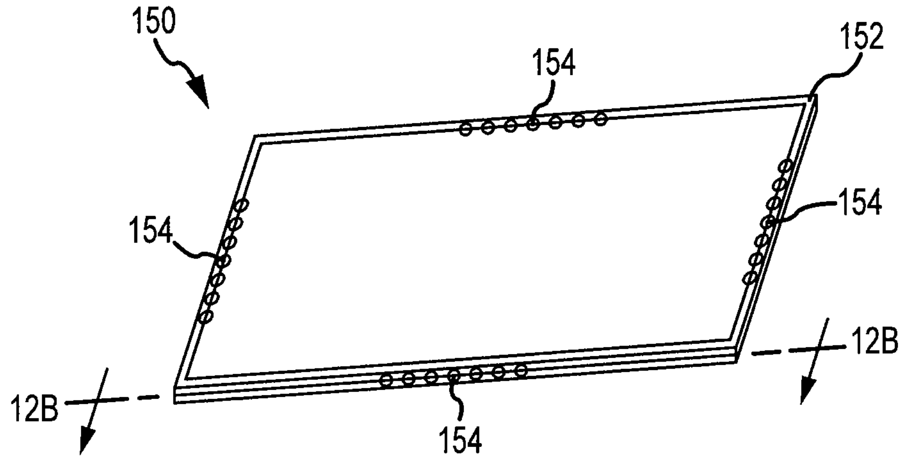
FIG. 12A-12B illustrates a tablet computing device and a cross-sectional view of the device in accordance with an embodiment.
Figure 12B:
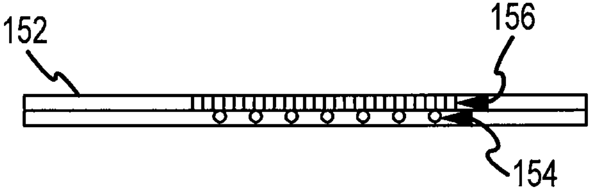

FIG. 12A illustrates a tablet computing device 150 in accordance with yet another embodiment. As with the above described embodiments, a housing 152 of the tablet computing device contains a number of sensors/actuators 154 similar to embodiments described above. In particular, for example, in one embodiment the housing 152 may include touch sensors, pressure sensors, light emitters, and/or haptic actuators, etc. represented by the sensors/actuators 154 and accelerometers. Similar to embodiments described above, the housing 152 of the tablet computing device 150 may be configured to provide input and output for the computing device 150. FIG. 12B illustrates a cross-sectional view of the device 150 showing apertures 156 through an external wall of the housing 152. The apertures are microperforations in housing 152 to allow for output such as light to pass through the housing 152. The microperforations may be formed in accordance with known techniques. The microperforations 156 are generally imperceptible to a naked eye. Thus, the surface of the housing 152 does not appear to be an input/out device.

In one example, the volume outputted by the device's speakers of the device and/or the brightness of the display may be adjusted by touching or applying pressure to the housing 152. In one embodiment, the amount of pressure may be determinative as to how the volume will be adjusted. For example, a pressure threshold may be provided above which the volume will be adjusted up and below which the volume may be adjusted down. In other embodiments, the volume may be adjusted by determining a movement upward or downward on the surface and adjusting the volume accordingly, i.e., adjusting up for a sensed upward movement.

Additionally, the sensors of the sensor/actuator 154 may be useful for determining when the tablet computing device 150 is being held and where the device 150 is being held. For example, if a user is holding the device on a left side of the device 150, the device 150 may sense the touch and/or pressure resultant from the holding but not be able to interpret the sensed touch and/or pressure. However, if the touch and/or pressure is applied consistently, i.e., the touch and/or pressure does not include intermittent or periodic impulses, and is applied for a prolonged period of time, e.g., more than a second or a few seconds, then the device 150 may determine that the touch and/or pressure applied to the left side of the device is from the device 150 being held. Hence, the touch and/or pressure sensed from the left side will be discounted as being related to the user holding the device 150 and not interpreted as input from the user to perform a function.

The input from the sensors may be interpreted differently depending on the context in which user input is received. In one embodiment, sensed input may be used to unlock or awake the device 150 from a sleep mode. For example, if the device 150 is locked or asleep, upon determining a user handling the device 150 through sensing touch or pressure being applied to particular parts of the housing 152 and or movement of the device 150, an application or start-up routine may be launched that requires certain input to unlock or otherwise bring the device 150 to a fully functional state. The housing 152 may be used to receive the input necessary to unlock the device. In one example, a user may apply pressure to the left side and the right side of the device in some combination (e.g., left, left, right, right, etc.) to unlock the device.

Additionally, the input from sensors located at a particular area of the housing 152 may be interpreted differently from input from sensors located at other areas of the housing 152. For example, input (such as pressure or touch) sensed by sensors located near a lower edge of the housing may be interpreted to adjust the brightness of the display, whereas input sensed by sensors located near the right hand side of the housing 152 may be interpreted to adjust the volume output by speakers of the device 150. In other embodiments, different types of input received from a particular area of the housing 152 may be interpreted in different ways. For example, sliding a finger along the lower edge of the housing 152 may adjust the brightness of the display, whereas a double tap to the lower edge of the housing may turn the device on and/or off.

The sensors of the sensor/actuator 154 may also be used in combination with the accelerometers to appropriately orient the output of the tablet computing device 150. Returning to the example of the user holding the tablet computing device 150 on the left side, if the accelerometers sense a rotational movement about an axis determined to be near where the touch or pressure from holding the device 150 is applied, content displayed by the tablet may be rotated commensurately to facilitate a user viewing the content.

Although various specific embodiments have been described above, it should be appreciated that a single device may implement various different aspects of the specific embodiments described above. Further, one or more aspect may be implemented in an embodiment without including other aspects.

What is claimed is:

1. An electronic device, comprising:

a housing with first and second portions coupled by a hinge, the housing having an exterior surface;

a first display in the first portion of the housing and configured to display a first image;

a second display in the second portion of the housing and configured to display a second image;

a touch sensor configured to detect touch input on the exterior surface of the housing; and a controller enclosed in the housing and communicatively coupled to the touch sensor, wherein the controller is configured to generate an output signal based on a duration of the touch input from the touch sensor, wherein the controller generates a first output signal for a first duration and a second output signal for a second duration, wherein the first duration is different than the second duration, and wherein the first output signal is different than the second output signal.

2. The electronic device of claim 1, wherein the controller is further configured to provide the output signal to at least one of the first or second displays and wherein at least one of the first or second displays is configured to adjust the first or second image respectively in response to the output signal.

3. The electronic device of claim 1, wherein the first duration is below a threshold level, wherein the second duration is above the threshold level, and wherein the first and second durations are non-zero durations.

4. The electronic device of claim 1, further comprising:

a speaker with a volume, wherein the controller is further configured to provide the output signal to the speaker and wherein the speaker is configured to adjust the volume upward in response to the first output signal and to adjust the volume downward in response to the second output signal.

5. The electronic device of claim 1, further comprising:

a haptic feedback device configured to provide haptic feedback through the exterior surface of the housing in response to the output signal.

6. The electronic device of claim 1, wherein the controller is further configured to initiate a sleep function of the electronic device in response to the touch input on the exterior surface of the housing.

7. The electronic device of claim 1, wherein the controller is further configured to initiate a wake function of the electronic device in response to the touch input on the exterior surface of the housing.

8. The electronic device of claim 1, wherein the controller is further configured to turn off the electronic device in response to the touch input on the exterior surface of the housing.

9. The electronic device of claim 1, wherein the controller is configured to output the first or second output signal in response to a single touch on the exterior surface of the housing and a different third output signal in response to a double touch on the exterior surface of the housing.

10. An electronic device, comprising:

a housing with first and second portions coupled by a hinge, the housing having an exterior surface;

a first display in the first portion of the housing and configured to display a first image;

a second display in the second portion of the housing and configured to display a second image;

a pressure sensor configured to detect a press on the exterior surface of the housing; and a controller enclosed in the housing and communicatively coupled to the pressure sensor, wherein the controller is configured to generate an output signal based on a duration of the press on the exterior surface of the housing, wherein the controller generates a first output signal for a first duration and a second output signal for a second duration, wherein the first duration is different than the second duration, and wherein the first output signal is different than the second output signal.

11. The electronic device of claim 10, wherein the housing has an interior surface and wherein the first and second displays emit light through the interior surface of the housing.

12. The electronic device of claim 10, wherein the controller generates a third output signal for a third duration, wherein the third duration is different from the first and second durations, and wherein the third output signal is different from the first and second output signals.

13. The electronic device of claim 10, wherein the controller is further configured to provide the output signal to at least one of the first or second displays and wherein at least one of the first or second displays is configured to adjust a brightness of the first or second image respectively in response to the output signal.

14. The electronic device of claim 10, wherein the controller is further configured to provide the output signal to at least one of the first or second displays and wherein at least one of the first or second displays is configured to display a third image different from the first or second image in response to the output signal.

15. A portable electronic device, comprising:

a housing having a surface with first and second portions;

a display configured to display an image, wherein the display overlaps the first portion of the surface;

at least one light source configured to illuminate the second portion of the surface;

a sensor configured to detect a user input signal; and a controller coupled to the sensor, wherein the controller is configured to generate an output signal based on a strength of the user input signal, wherein the controller is configured to provide the output signal to the at least one light source, and wherein the at least one light source is configured to illuminate the second portion of the surface in response to the output signal.

16. The portable electronic device of claim 15, wherein the controller is further configured to generate the output signal based on a duration of the user input signal.

17. The portable electronic device of claim 15, wherein the at least one light source is configured to illuminate an icon on the second portion of the surface.

18. The portable electronic device of claim 17, further comprising:

a port, wherein the icon indicates a type of the port and wherein the port is on a second surface of the housing orthogonal to the second portion of the surface.

19. The portable electronic device of claim 15, wherein the output signal increases in response to an increase in the strength of the user input signal.

20. The portable electronic device of claim 15, wherein the sensor comprises a proximity sensor.

* * * * *